(12) United States Patent
Fujimoto et al.

(10) Patent No.: US 8,369,047 B2
(45) Date of Patent: Feb. 5, 2013

(54) MAGNETIC HEAD SUSPENSION AND MANUFACTURING METHOD THEREOF WITH PAIR OF PIEZOELECTRIC ADJUSTERS

(75) Inventors: Yasuo Fujimoto, Kyoto-fu (JP); Satoru Takasugi, Kyoto-fu (JP); Kenji Mashimo, Kyoto-fu (JP)

(73) Assignee: Suncall Corporation, Kyoto-Fu (JP)

( * ) Notice: Subject to any disclaimer, the term of this patent is extended or adjusted under 35 U.S.C. 154(b) by 120 days.

(21) Appl. No.: 13/082,169

(22) Filed: Apr. 7, 2011

(65) Prior Publication Data

US 2011/0249366 A1    Oct. 13, 2011

(30) Foreign Application Priority Data

Apr. 8, 2010   (JP) ................................. 2010-089418

(51) Int. Cl.
*G11B 5/56*   (2006.01)
*G11B 21/24*   (2006.01)

(52) U.S. Cl. .................................. 360/294.4; 29/603.1

(58) Field of Classification Search .... 360/294.4–294.7; 29/603.1

See application file for complete search history.

(56) References Cited

U.S. PATENT DOCUMENTS

| | | | |
|---|---|---|---|
| 6,614,627 B1* | 9/2003 | Shimizu et al. ............ | 360/294.4 |
| 2003/0142448 A1* | 7/2003 | Koganezawa ............... | 360/294.4 |

FOREIGN PATENT DOCUMENTS

JP    2002-050140 A    2/2002

* cited by examiner

*Primary Examiner* — Joseph Feild
*Assistant Examiner* — Gustavo Polo
(74) *Attorney, Agent, or Firm* — Sterne, Kessler, Goldstein & Fox P.L.L.C.

(57) ABSTRACT

A flexure metal plate includes distal and proximal end side-center-support plate forming regions that are positioned on distal and proximal sides within an open section. To a distal end section of a supporting part that is positioned on a distal side of the open section, first and second-distal side-metal plates are fixed so as to be positioned on an outer side of the distal end side-center-support plate forming region in a width direction, and to a proximal end section of the supporting part that is positioned on a proximal side of the open section, first and second-proximal side-metal plates are fixed so as to be positioned on an outer side of the proximal end side-center-support plate forming region in the width direction. The first and second-distal side-metal plates form a distal end side-support plate in cooperation with the distal end side-center-support plate forming region.

16 Claims, 20 Drawing Sheets

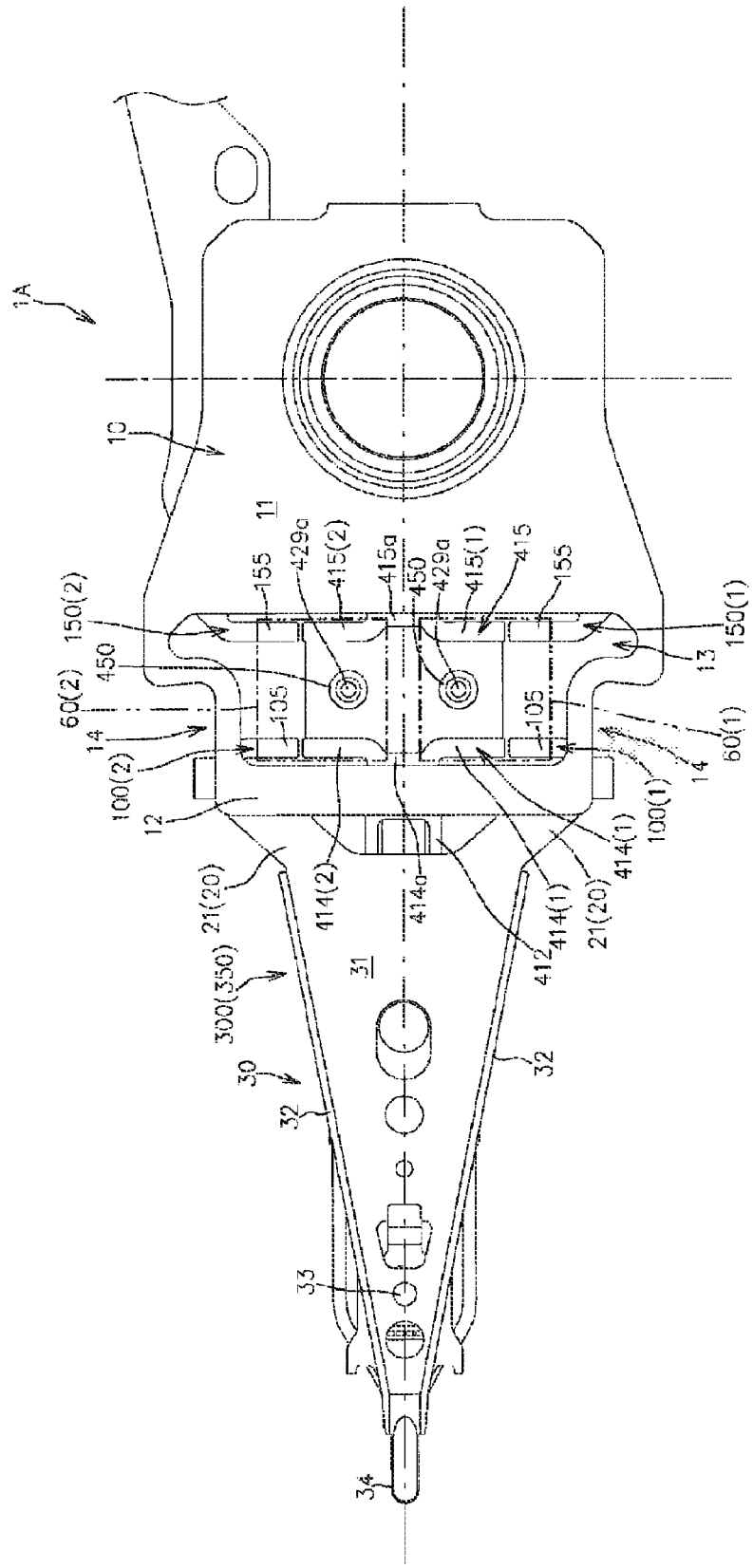

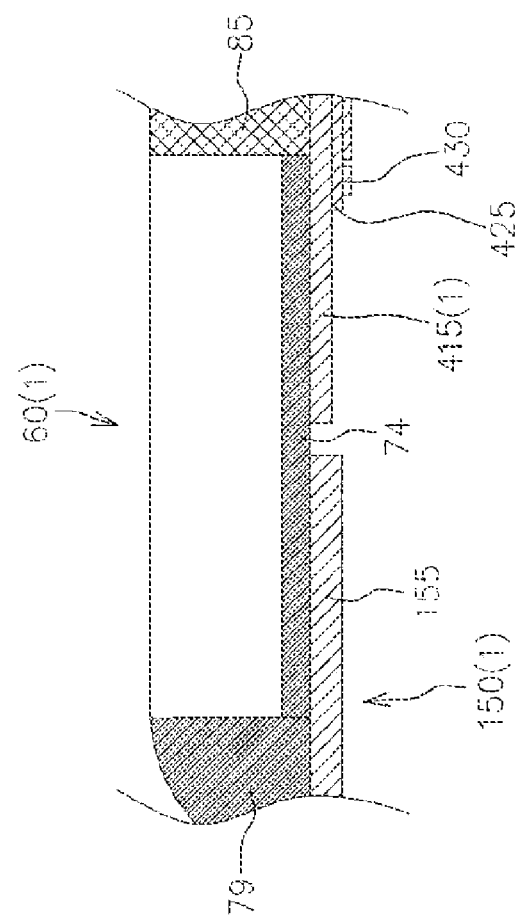

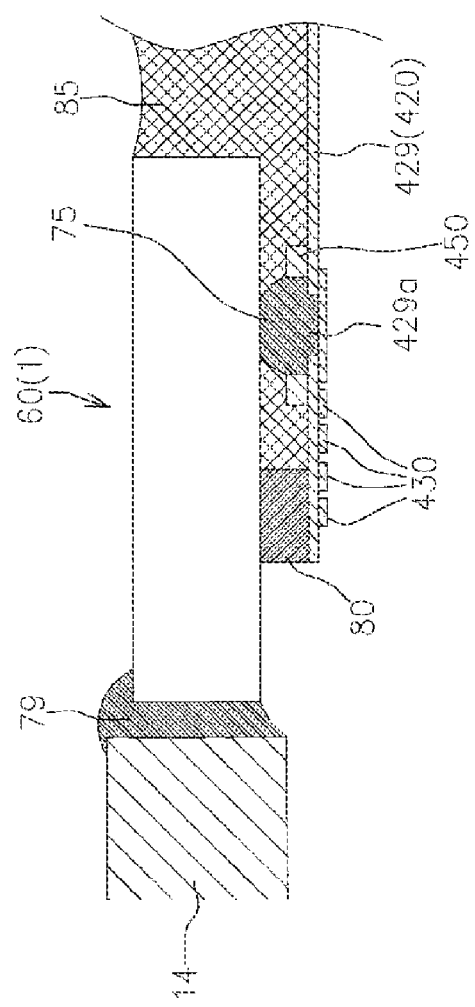

MAGNETIC HEAD SUSPENSION AND MANUFACTURING METHOD THEREOF WITH PAIR OF PIEZOELECTRIC ADJUSTERS

BACKGROUND OF THE INVENTION

1. Field of the Invention

The present invention relates to a magnetic head suspension for supporting a magnetic head slider that reads and/or writes data from and to a recording medium such as a hard disk drive, and also relates to a manufacturing method of the magnetic head suspension.

2. Related Art

Increase in capacity of a magnetic disk device requires improvement in accuracy for positioning a magnetic head slider on a target track. In this regard, there has been proposed a magnetic head suspension that enables coarse motion of a magnetic head slider in a seek direction by a main actuator such as a voice coil motor as well as micro motion of the magnetic head slider in the seek direction by a piezoelectric element functioning as a sub actuator.

For example, Japanese Unexamined Patent Application Publication No. 2002-050140 (hereinafter referred to as prior art document) proposes to provide a magnetic head suspension with the piezoelectric element with a following configuration in order to reduce a thickness in a direction orthogonal to a disk surface as much as possible.

More specifically, the magnetic head suspension disclosed by the prior art document includes a load bending part that generates a load for pressing the magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that is attached to the supporting part.

The supporting part is provided with a proximal end section that is connected directly or indirectly to the main actuator, a distal end section to which the load bending part is connected, an open section that is positioned between the proximal end section and the distal end section in a suspension longitudinal direction, and paired right and left connecting beams that are positioned on both sides of the open section in a suspension width direction and connect the proximal end section and the distal end section.

The piezoelectric elements are mounted to the supporting part, with use of a proximal end side-support plate and a distal end side-support plate that are respectively fixed to disk-facing surfaces of the proximal end section and the distal end section by welding, so as to be positioned within the open section in a plan view as viewed along a direction orthogonal to the disk surface.

More specifically, the distal end side-support plate includes a distal end side-fixed region that is fixed to the disk-facing surface of the distal end section in a state of being overlapped therewith, and a distal end side-supporting region that extends from the distal end side-fixed region so as to be positioned within the open section.

Similarly, the proximal end side-support plate includes a proximal end side-fixed region that is fixed to the disk-facing surface of the proximal end section in a state of being overlapped therewith, and a proximal end side-supporting region that extends from the proximal end side-fixed region so as to be positioned within the open section.

Under the configuration, the piezoelectric element includes a distal side-end surface and a proximal side-end surface that face a proximal side-end surface of the distal end section and a distal side-end surface of the proximal end section, respectively, with insulative adhesive agent being inserted between the respective facing surfaces, and a disk-facing surface having a distal side that is mounted on the distal end side-supporting region of the distal end side-support plate with insulative adhesive agent being inserted between them and a proximal side that is mounted on the proximal end side-supporting region of the proximal end side-support plate with insulative adhesive agent being inserted between them.

The magnetic head suspension with the configuration makes it possible to prevent as much as possible increase of thickness of the magnetic heads suspension due to provision of the piezoelectric elements, since the piezoelectric elements are mounted on the supporting part in a state where a least part of each of the piezoelectric elements is overlapped with the supporting part in the thickness direction.

However, the magnetic bead suspension leaves room for improvement in respect of fixing structure of a flexure metal plate of the flexure part.

More specifically, the flexure part includes the flexure metal plate welded to the disk-facing surfaces of the load beam part and the supporting part, an insulating layer such as a resin laminated on a disk-facing surface of the flexure metal plate, and a signal wiring formed by a conductive member that is laminated on a disk-facing surface of the insulating layer.

The flexure metal plate is fixed to the supporting part by welding at both sides of the open section in a suspension longitudinal direction. Here, the distal end side-support plate and the proximal end side-support plate are fixed to the distal side and the proximal side of the open section by welding, respectively, as explained above.

In other words, in the magnetic head suspension disclosed by the prior art document, a region of the flexure metal plate that is positioned on a distal side of the open section is welded to the fixed region of the distal end side-support plate as well as the distal end section of the supporting part while being overlapped with the disk-facing surface of the distal end side-support plate.

Similarly, a region of the flexure metal plate that is positioned on a proximal side of the open section is welded to the fixed region of the proximal end side-support plate as well as the proximal end section of the supporting part while being overlapped with the disk-facing surface of the proximal end side-support plate.

As described above, in the magnetic head suspension disclosed by the prior art document, at an area positioned on a distal side of the open section, three members inclusive of the flexure metal plate, the distal end side-support plate and the supporting part are overlapped with and welded to one another. At an area positioned on a proximal side of the open section, three members inclusive of the flexure metal plate, the proximal end side-support plate and the supporting part are overlapped, with and welded to one another. Resultingly, there is posed a problem that it is difficult to reduce the thickness and weight of the magnetic head suspension.

Moreover, since the three members are welded to one another, weld strength must be heightened, which results in a problem that a strain is likely to occur in the magnetic head suspension. The strain has a bad effect on floating posture of the magnetic head slider and vibration characteristics of the magnetic head suspension.

SUMMARY OF THE INVENTION

The present invention has been achieved in view of the above conventional art, and it is an object thereof to provide a magnetic head suspension in which a flexure metal plate of a flexure part is fixed to a supporting part and a load beam part by welding, and piezoelectric elements are disposed so as to be positioned within an open section formed in the supporting part in a plan view as viewed along a direction orthogonal to a disk surface, the magnetic head suspension capable of including a distal end side-support plate and a proximal end side-support plate that support the piezoelectric elements within the open section, without three members being overlapped with and welded to one another.

In order to achieve the object, the present invention provides a magnetic head suspension including a load bending part that generates a load for pressing a magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part, so as to be symmetrical with each other with respect to a suspension longitudinal center line and have expansion and contraction directions different from each other, in order to enable micro motion of the magnetic head slider in a seek direction, wherein the supporting part includes a proximal end section that is directly or indirectly connected to the main actuator, a distal end section to which the load bending part is connected, an open section that is positioned between the proximal end section and the distal end section in a suspension longitudinal direction, and paired right and left connecting beams that are positioned on both sides of the open section in a suspension width direction and connect the proximal end section and the distal end section, wherein the load bending part includes paired right and left elastic plates that have plate surfaces facing the disk surface and are disposed away from each other with the suspension longitudinal center line being sandwiched between them, the elastic plates having proximal ends connected to the distal end section and distal ends supporting a proximal side of the load beam part, wherein the flexure part includes a flexure metal plate welded to disk-facing surfaces of the load beam part and the supporting part, an insulating layer laminated on a disk-facing surface of the flexure metal plate, and a signal wiring laminated on a disk-facing surface of the insulating layer, wherein the flexure metal plate includes a load beam part-overlapped region that is overlapped with and welded to the disk-facing surface of the load beam part, a supporting part-distal side-overlapped region that is overlapped with and welded to the disk-facing surface of the distal end section between the paired elastic plates in the suspension width direction, a load bending part-corresponding part that connects the load beam part-overlapped region and the supporting part-distal side-overlapped region between the paired elastic plates in the suspension width direction, a supporting part-proximal side-overlapped region that is overlapped with and welded to the disk-facing surface of the proximal end section, a distal end side-center-support plate forming region that extends from the supporting part-distal side-overlapped region so as to be positioned within the open section, and a proximal end side-center-support plate forming region that extends from the supporting part-proximal side-overlapped region so as to be positioned within the open section in a state of being away from the distal end side-center-support plate forming region in the suspension longitudinal direction, wherein the insulating layer includes a load beam part-corresponding region, a load bending part-corresponding, a supporting part-distal side-corresponding region, a distal end side-center-support plate corresponding region, a proximal end side-center-support plate corresponding region and a supporting part-proximal side-corresponding region that are laminated on the disk-facing surfaces of the load beam part-overlapped region, the load bending part-corresponding part, the supporting part-distal side-overlapped region, the distal end side-center-support plate forming region, the proximal end side-center-support plate forming region and the supporting part-proximal side-overlapped region of the flexure metal plate, respectively, and further includes a connecting region that connects the distal end side-center-support plate corresponding region and the proximal end side-center-support plate corresponding legion, wherein there are provided paired right and left first and second-distal side-metal plates that are fixed to the disk-facing surface of the distal end section, and there are also provided paired right and left first and second-proximal side-metal plates that are fixed to the disk-facing surface of the proximal end section, wherein each of the paired distal side-metal plates includes a distal end side-fixed region overlapped with and fixed to a portion of the disk-facing surface of the distal end section that is positioned on an outer side of the supporting part-distal side-overlapped region in the suspension width direction, and a distal end side-lateral-support plate forming region extending from the distal end side-fixed region so as to be positioned on an outer side of the distal end side-center-support plate forming region in the suspension width direction within the open section, wherein each of the paired proximal side-metal plates includes a proximal end side-fixed region overlapped with and fixed to a portion of the disk-facing surface of the proximal end section that is positioned on an outer side of the supporting part-proximal side-overlapped region in the suspension width direction, and proximal end side-lateral-support plate forming region extending from the proximal end side-fixed region so as to be positioned on an outer side of the proximal end side-center-support plate forming region in the suspension width direction within the open section, wherein the first piezoelectric element has a distal side-end surface and a proximal-side end surface that face a proximal side-end surface of the distal end section and a distal side-end surface of the proximal end section, respectively, with end surface side-insulative adhesive agents being interposed, and also has a disk-facing surface whose distal side mounted on a first piezoelectric element-distal end side-support plate, which is formed by a distal end side-first width portion of the distal end side-center-support plate forming region that is poisoned on one side in the suspension width direction and the distal end side-lateral-support plate forming region of the first-distal side-metal plate, with a distal side-insulative adhesive agent being interposed, and proximal side mounted on a first piezoelectric element-proximal end side-support plate, which is formed by a proximal end side-first width portion of the proximal end side-center-support plate forming region that is poisoned on the one side in the suspension width direction and the proximal end side-lateral-support plate forming region of the first-proximal side-metal plate, with a proximal side-insulative adhesive agent being interposed, and wherein the second piezoelectric element has a distal side-end surface and a proximal-side end surface that face the proximal side-end surface of the distal end section and the distal side-end surface of the proximal end section, respectively, with end surface side-insulative adhesive agents being interposed, and also has a disk-facing surface whose distal side mounted on a second piezoelectric element-distal end side-support plate, which is formed by a distal end side-second width portion of the distal end side-center-support plate forming region that is poisoned on the other one side in the suspension width direction and the distal end side-lateral-support plate forming region of the second-distal side-metal plate, with a distal side-insulative adhesive agent being interposed, and proximal side mounted on a second piezoelectric element-proximal end side-support plate, which is formed by a proximal end side-second width portion of the proximal end side-center-support plate forming region that is poisoned on the other one side in the suspension width direction and the proximal end side-lateral-support plate forming region of the second-proximal side-metal plate, with a proximal side-insulative adhesive agent being interposed.

In the magnetic head suspension according to the present invention, the flexure metal plate of the flexure part that is fixed to the load beam part and the supporting part includes a distal end side-center-support plate forming region and a proximal end side-center-support plate forming region that are positioned on distal and proximal sides within the open section of the supporting part, the paired right and left first and second-distal side-metal plates are fixed to the distal end section of the supporting part that is positioned on a distal side of the open section so as to be positioned on an outer side of the distal end side-center-support plate forming region in the suspension width direction, the paired right and left first and second-proximal side-metal plates are fixed to the proximal end section of the supporting part that is positioned on a proximal side of the open section so as to be positioned on an outer side of the proximal end side-center-support plate forming region in the suspension width direction, the first and second-distal side-metal plates form the first and second piezoelectric element-distal end side-support plates in cooperation with the distal end side-center-support plate forming region, and the first and second-proximal side-metal plates form the first and second piezoelectric element-proximal end side-support plates in cooperation with the proximal end side-center-support plate forming region. The thus configured magnetic head suspension makes it possible to form the distal end side-support plates and the proximal end side-support plates without three members being overlapped with and welded to one another, thereby reducing the thickness and the weight of the magnetic head suspension, and also effectively preventing the magnetic head suspension from being strained due to welding.

In one embodiment, the flexure metal plate may include a bridge region that is positioned between the paired first and second piezoelectric elements in the suspension width direction and connects the distal end side-center-support plate forming region and the proximal end side-center-support plate forming region.

In another embodiment, the flexure metal plate is configured so as not to exist between the distal end side-center-support plate forming region and the proximal end side-center-support plate forming region. In this case, a relative position between the distal end side-center-support plate forming region and the proximal end side-center-support plate forming region is kept by the insulating layer and the signal wiring of the flexure part.

In a preferably configuration, the connecting region is disposed so as to be at least partially overlapped with the first and second piezoelectric elements in a plan view, the flexure part includes first and second voltage supply wirings laminated on the disk-facing surface of the insulating layer, the first and second voltage supply wirings have proximal ends capable of being connected to an outside voltage supply source and distal ends overlapped with the corresponding piezoelectric elements in a plan view, the connecting region of the insulting layer is formed with openings at positions corresponding to the distal ends of the first and second voltage supply wirings so that the distal ends of the first and second voltage supply wirings are electrically connected to electrode layers of the corresponding piezoelectric elements that are positioned closer to the disk surface through conductive adhesive agents.

In a more preferable configuration, there are provided metal rings on a surface of the insulting layer that is opposite from the disk-facing surface so as to surround the conductive adhesive agents.

The metal rings could be made from a metal sheet for forming the flexure metal plate.

In any one of the above various configurations, there are preferably provided paired first sealed space forming-insulative adhesive agents on both sides in the suspension width direction of the conductive adhesive agent for the first piezoelectric element, the paired first sealed space forming-insulative adhesive agents connecting the distal side-insulative adhesive and the proximal side-insulative adhesive agent with respect to the suspension longitudinal direction and also connecting the insulting layer and the lower electrode layer of the first piezoelectric element with respect to a direction orthogonal to the disk surface, and there are also provided paired second sealed space forming-insulative adhesive agents on both sides in the suspension width direction of the conductive adhesive agent for the second piezoelectric element, the paired second sealed space forming-insulative adhesive agents connecting the distal side-insulative adhesive and the proximal side-insulative adhesive agent with respect to the suspension longitudinal direction and also connecting the insulting layer and the lower electrode layer of the second piezoelectric element with respect to the direction orthogonal to the disk surface.

Alternatively, it is possible that there is provided an outer lateral side-insulative adhesive agent on an outer side in the suspension width direction of the conductive adhesive agent for the first piezoelectric element, the outer lateral side-insulative adhesive agent connecting the distal side-insulative adhesive and the proximal side-insulative adhesive agent with respect to the suspension longitudinal direction and also connecting the insulting layer and the lower electrode layer of the first piezoelectric element with respect to a direction orthogonal to the disk surface, and there is provided an outer lateral side-insulative adhesive agent on an outer side in the suspension width direction of the conductive adhesive agent for the second piezoelectric element, the outer lateral side-insulative adhesive agent connecting the distal side-insulative adhesive and the proximal side-insulative adhesive agent with respect to the suspension longitudinal direction and also connecting the insulting layer and the lower electrode layer of the second piezoelectric element with respect to the direction orthogonal to the disk surface.

In a preferable configuration, a space, which is formed by the distal side-insulative adhesive agent for the first piezoelectric element, the distal side-insulative adhesive agent for the second piezoelectric element, the proximal side-insulative adhesive agent for the first piezoelectric element, the proximal side-insulative adhesive agent for the second piezoelectric element, the outer lateral side-insulative adhesive agent for the first piezoelectric element, the outer lateral side-insulative adhesive agent for the second piezoelectric element, the connecting region of the insulating layer, the lower electrode layer of the first piezoelectric element and the lower electrode layer of the second piezoelectric element, is filled with a sealing insulative adhesive agent.

In any one of the above various configurations, there are preferably provided outer lateral side-insulative adhesive agents so as to cover respective outer lateral surfaces of the first and second piezoelectric elements that face outward in the suspension width direction, the outer lateral side-insulative adhesive agents being connected to at least parts of the corresponding connecting beams.

In any one of the above various configurations, the distal end side-center-support plate forming region may preferably include a distal end side-center portion extending from the supporting part-distal side-overlapped region toward the proximal side of the suspension, the distal end side-first width portion extending from the distal end side-center portion toward one side in the suspension width direction to form the first piezoelectric element-distal end side-support plate in cooperation with the distal end side-lateral-support plate forming region of the first-distal side-metal plate, and the distal end side-second width portion extending from the distal end side-center portion toward the other one side in the suspension width direction to form the second piezoelectric element-distal end side-support plate in cooperation with the distal end side-lateral-support plate forming region of the second-distal side-metal plate. The proximal end side-center-support plate forming region may preferably include a proximal end side-center portion extending from the supporting part-proximal side-overlapped region toward the distal side of the suspension, the proximal end side-first width portion extending from the proximal end side-center portion toward one side in the suspension width direction to form the first piezoelectric element-proximal end side-support plate in cooperation with the proximal end side-lateral-support plate forming region of the first-proximal side-metal plate, and the proximal end side-second width portion extending from the proximal end side-center portion toward the other one side in the suspension width direction to form the second piezoelectric element-proximal end side-support plate in cooperation with the proximal end side-lateral-support plate forming region of the second-proximal side-metal plate. The first and second piezoelectric element-distal end side-support plates are disposed so that a gap is made between the proximal edge of the distal end section and the distal edges of the both support plates, and the first and second piezoelectric element-proximal end side-support plates are disposed so that a gap is made between the distal edge of the proximal end section and the proximal edges of the both support plates.

In any one of the above various configurations, the load beam part, the load bending part and the distal side-metal plates are integrally formed with one another.

The magnetic head suspension according to any one of the above various configurations may further include a first connecting piece that is positioned on an outer side of the first piezoelectric element in the suspension width direction and connects the first-distal side-metal plate and the first-proximal side-metal plate, and a second connecting piece that is positioned on an outer side of the second piezoelectric element in the suspension width direction and connects the second-distal side-metal plate and the second-proximal side-metal plate. Each of the first and second connecting pieces has an accordion shape in a plan view.

In place of the first and second connecting pieces, the magnetic head suspension according to any one of the above various configurations may further include a first extending piece that is positioned on an outer side of the first piezoelectric element with respect to the suspension width direction and extends along the suspension longitudinal direction, and a second extending piece that is positioned on an outer side of the second piezoelectric element with respect to the suspension width direction and extends along the suspension longitudinal direction.

The first extending piece includes a first distal portion connected to the first-distal end side-metal plate and a first proximal portion connected to the first-proximal end side-metal plate, the first distal portion and the first proximal portion facing to each other with having a gap between them.

The second extending piece includes a second distal portion connected to the second-distal end side-metal plate and a second proximal portion connected to the second-proximal end side-metal plate, the second distal portion and the second proximal portion facing to each other with having a gap between them.

In a case where the proximal end of the connecting beam that is connected to the proximal end section is positioned farther outward than the distal end that is connected to the distal end section with respect to the suspension width direction in the configuration with the first and second extending pieces, the magnetic head suspension may be provided with a first auxiliary connecting piece having a distal end that is connected to the first distal portion and a distal end that is positioned farther outward than the distal end in the suspension width direction and is connected to the first-proximal end side-metal plate, and a second auxiliary connecting piece having a distal end that is connected to the second distal portion and a distal end that is positioned farther outward than the distal end in the suspension width direction and is connected to the second-proximal end side-metal plate.

Furthermore, the present invention provide a manufacturing method of the magnetic head suspension defined by any one of the above various configurations, the manufacturing method including a step of forming an intermediate metal sheet from a load beam substrate, the intermediate metal sheet including plural of suspension distal side-man bodies and plural of the paired proximal side-metal plates, each of the suspension distal side-man bodies integrally including the load beam part, the load bending part and the paired distal side-metal plates, the plural of suspension distal side-man bodies being connected to a carrier through first support pieces, the plural of paired proximal side-metal plates being connected directly or indirectly to the carrier through second support pieces, a step of fixing the supporting part to the suspension distal side-man body and the corresponding paired proximal side-metal plates, and a step of separating an assembly in which the suspension distal side-man body, the paired proximal side-metal plates and the supporting part are integrated with one another from the carrier by cutting the first and second support pieces.

In one embodiment, the manufacturing method may further include a step of fixing the flexure part to the assembly before the step of separating the assembly from the carrier.

Alternatively, manufacturing method may further include a step of fixing the flexure part to the assembly after the step of separating the assembly from the carrier.

Furthermore, the present invention provides a manufacturing method of the magnetic head suspension with the sealing insulative adhesive agent, the manufacturing method including a step of preparing a suspension intermediate in which the supporting part, the load bending part, the load beam part, the flexure part, the paired distal side-metal plates and the paired proximal side-metal plates are integrated with one another, a first adhesive application step of applying the distal side-insulative adhesive agent onto the first and second piezoelectric element-distal end side-support plates and also applying the proximal side-insulative adhesive agent onto the first and second piezoelectric element-proximal end side-support plates, a second adhesive application step of applying the outer lateral side-insulative adhesive agent for the first piezoelectric element and the outer lateral side-insulative adhesive agent for the second piezoelectric element, a third adhesive application step of applying the conductive adhesive agents for the first and second piezoelectric elements, a piezoelectric element setting step of setting the first and second piezoelectric elements at respective predetermined positions within the open section after the first to third adhesive application steps, a fourth adhesive application step of applying the end surface side-insulative adhesive agent before or after the piezoelectric element setting step, a curing step of curing the adhesives applied by the first to fourth steps so that the first and second piezoelectric elements are fixed, and a step of filling the sealing insulative adhesive agent in the space through the gap between the first and second piezoelectric elements in the suspension width direction from the opposite side from the disk surface.

The manufacturing method according to the present invention may further include a fifth adhesive application step of applying conductive adhesive agents so as to be across the respective electrode layers of the first and second piezoelectric elements, which are positioned on a side opposite from the disk surface, and the distal end section of the supporting part.

BRIEF DESCRIPTION OF THE DRAWINGS

FIG. 3 is a top view of the magnetic head suspension in a state where paired first and second piezoelectric elements have been removed.

FIG. 17 is a cross sectional view taken along line XVII-XVII in FIG. 15.

FIG. 18 is a cross sectional view taken along line XVIII-XVIII in FIG. 15.

DETAILED DESCRIPTION OF THE PREFERRED EMBODIMENTS

First Embodiment

Hereinafter, one preferred embodiment of a magnetic head suspension according to the present invention will be described, with reference to the attached drawings.

Figure 1A:
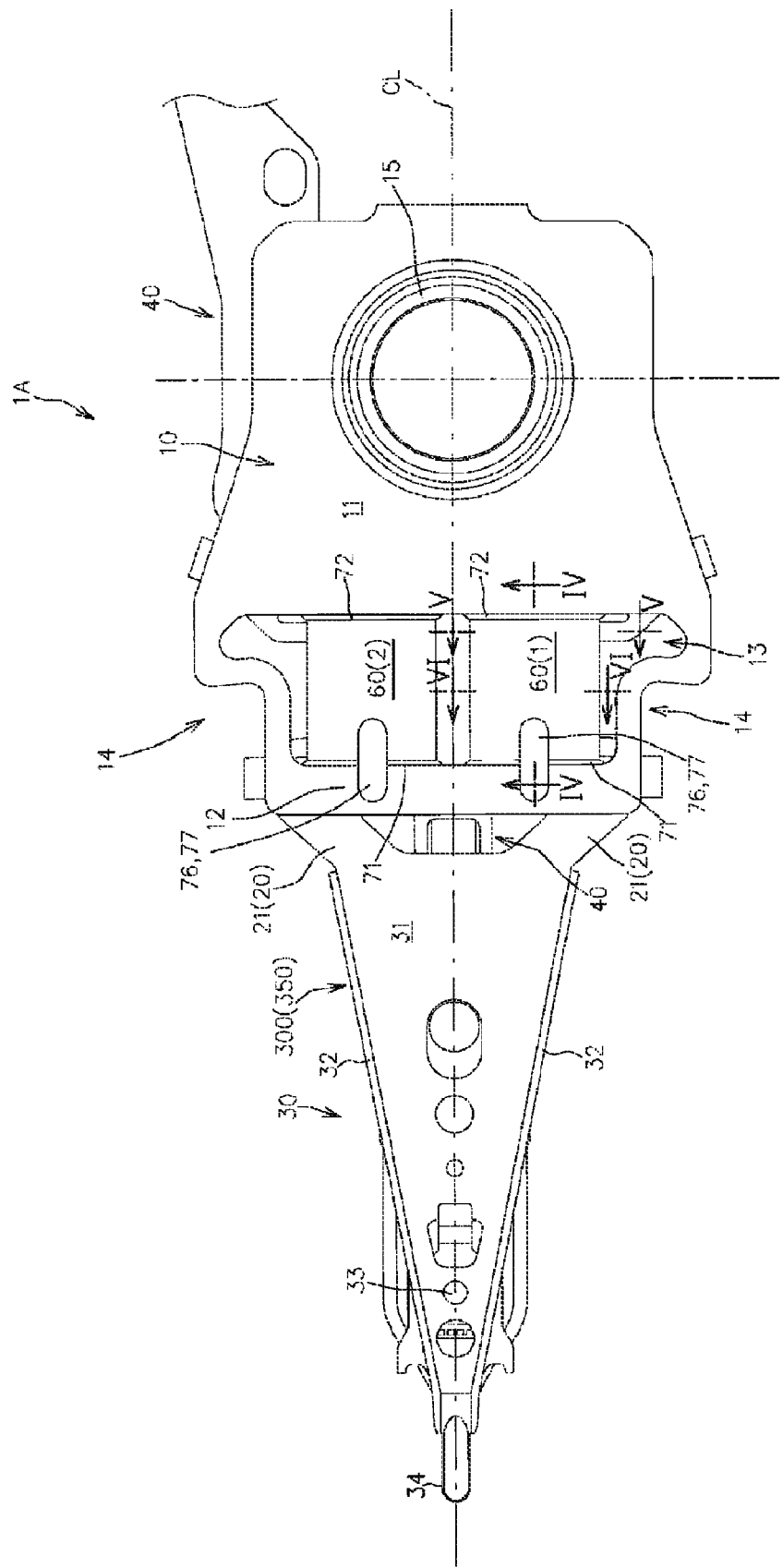
FIG. 1A is a top view of a magnetic head suspension according to a first embodiment of the present invention.
Figure 1B:
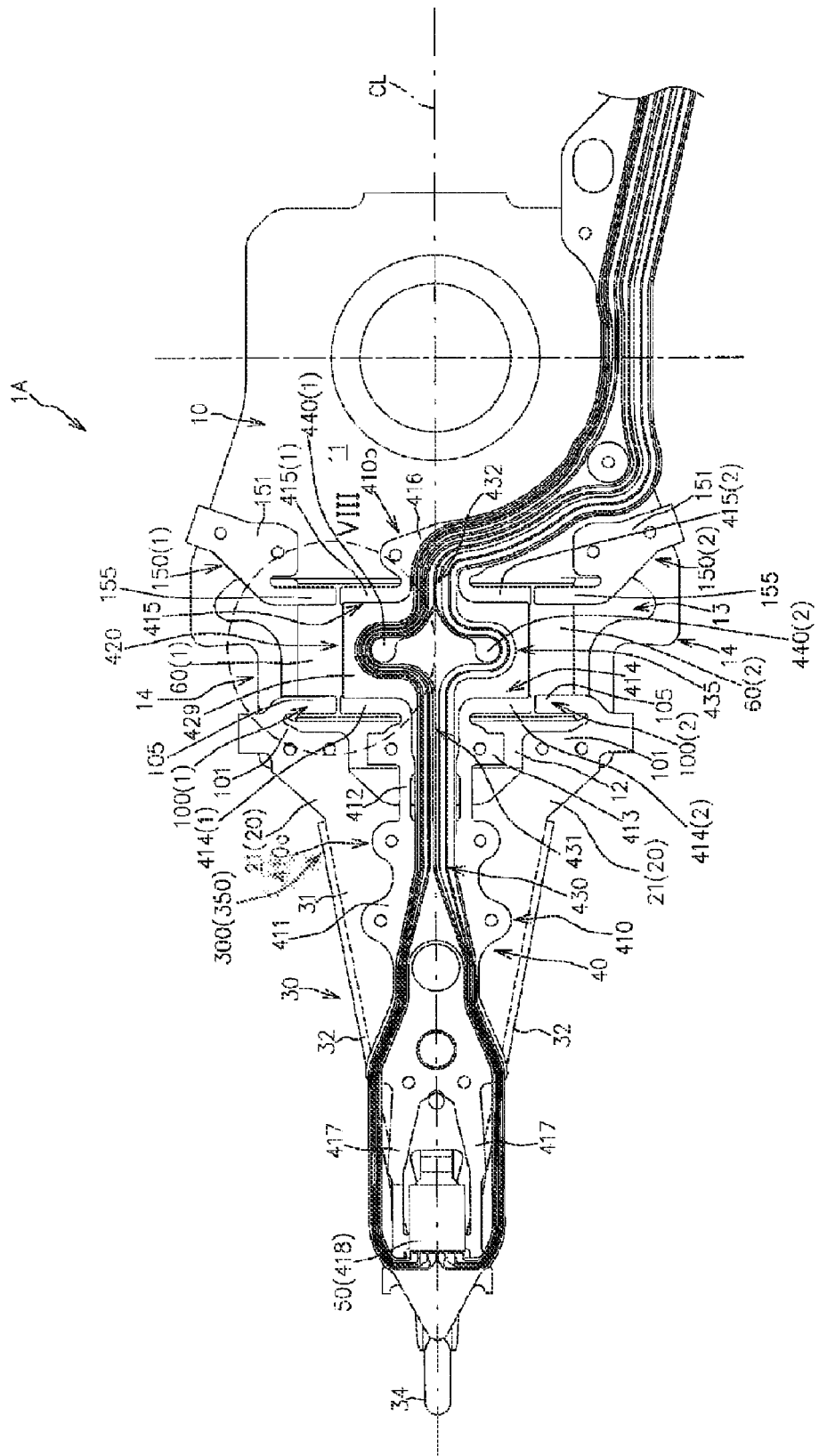
FIG. 1B is a bottom view of the magnetic head suspension according to the first embodiment.

FIGS. 1A and 1B are a top view (a plan view as viewed from a side opposite from a disk surface), and a bottom view (a bottom plan view as viewed from a side close to the disk surface) of a magnetic head suspension 1A according to the present embodiment, respectively. FIG. 1B indicates welding points with using small circles.

As shown in FIGS. 1A and 1B, the magnetic head suspension 1A includes a load bending part 20 that generates a load for pressing a magnetic head slider 50 toward a disk surface, a load beam part 30 that transmits the load to the magnetic head slider 50, a supporting part 10 that supports the load beam part 30 via the load bending part 20 and is swung about a swing center directly or indirectly by a main actuator, a flexure part 40 that is supported by the load beam part 30 and the supporting part 10 while supporting the magnetic head slider 50, and paired right and left piezoelectric elements 60(1), 60(2) that are attached to the supporting part 10 so as to be symmetrical with each other with respect to a suspension longitudinal center line CL and have expansion and contraction directions different from each other, in order to enable micro motion of the magnetic head slider 50 in a seek direction.

The supporting part 10 is a member for supporting the load beam part 30 through the load bending part 20 while being directly or indirectly connected to the main actuator such as a voice coil motor, and is therefore made to have relatively high rigidity.

In the present embodiment, the supporting part 10 is formed as a base plate including a boss portion 15 to which a distal end of a carriage arm (not shown) is joined by a swage processing, the carriage arm being connected to the main actuator.

The supporting part 10 may be preferably made from, for example, a stainless plate having a thickness of 0.1 mm to 0.8 mm.

It is of course possible to adopt as the supporting part 10 an arm having a proximal end that is connected to the swing center of the main actuator.

The supporting part 10 includes a proximal end section 11 that is directly or indirectly connected to the main actuator, a distal end section 12 to which the load bending part 20 is connected, an open section 13 that is positioned between the proximal end section 11 and the distal end section 12 in a suspension longitudinal direction, and paired right and left connecting beams 14 that are positioned on both sides of the open section 13 in a suspension width direction and connect the proximal end section 11 and the distal end section 12.

As described above, the load beam part 30 is a member for transmitting the load generated by the load bending part 20 to the magnetic head slider 50, and therefore is required to have a predetermined rigidity.

As shown in FIGS. 1A and 1B, in the present embodiment, the load beam part 30 has a plate-like main body portion 31 and flange portions 32 that are formed by being bent in a direction away from the disk surface at both sides of the main body portion 31 in the suspension width direction, and secures the rigidity thanks to the flange portions 32.

The load beam part 30 may be made from, for example, a stainless plate having a thickness of 0.02 mm to 0.1 mm.

Specifically, the load beam part 30 is provided, at its distal end section, with a protrusion 33 that is so-called dimple.

The protrusion 33 is protruded by, for example, about 0.05 mm to 0.1 mm, in a direction toward the disk surface. The protrusion 33 is brought into contact with an upper surface (a surface opposite from the disk surface) of a head-mounting region 418 of the flexure part 40, so that the load is transmitted to the head-mounting region 418 of the flexure part 40 through the protrusion 33.

In the present embodiment, the load beam part 30 further integrally includes a lift tab 34 that extends from a distal end of the main body portion 31 toward a distal end side in the suspension longitudinal direction. The lift tab 34 is a member that engages with a lamp provided in a magnetic disk device so as to cause the magnetic head suspension 50 to be away from the disk surface in z direction (a direction perpendicular to the disk surface) at the time when the magnetic head suspension 1A is swung by the main actuator so that the magnetic head slider 50 is positioned outward the disk surface in a radial direction.

The load bending part 20 has a proximal end connected to the supporting part 10 and a distal end connected to the load beam part 30, and generates the load for pressing the magnetic head suspension 50 toward the disk surface in accordance with its elastic deformation.

As shown in FIGS. 1A and 1B, in the present embodiment, the load bending part 20 includes paired right and left leaf springs 21 that have plate surfaces facing the disk surface and are disposed away from each other with the suspension longitudinal center due CL being sandwiched between them.

Preferably, the paired leaf springs 21 are elastically bended in such a direction as to cause the magnetic head suspension 50 to be come close to the disk surface before the magnetic head suspension 1A is mounted to the magnetic disk device, and is mounted to the magnetic disk device in a state where the paired leaf springs are elastically bended back so as to generate the pressing load.

The load bending part 20 is made from a stainless steel plate of 0.02 mm to 0.1 mm thick, for example.

In the present embodiment, as shown in FIGS. 1A and to 1B, the load bending part 20 is integrally formed with the load beam part 30.

More specifically, the magnetic head suspension 1A according to the present embodiment includes a load beam part/load bending part component 300 that is cut out from a load beam substrate and integrally forms the load beam part 30 and the load bending part 20. The load beam part/load bending part component 300 is welded to the supporting part 10 in a state where an upper surface of the load beam part/load bending part component 300 that is positioned on a side opposite from the disk surface is brought into contact with a lower surface, which faces the disk surface, of the distal end section 12 of the supporting part 10.

The flexure part 40 is fixed by welding to the load beam part 30 and the supporting part 10 while supporting the magnetic head slider 50.

In the present embodiment, the flexure part 40 integrally includes a signal wiring 430 for electrically connecting the magnetic head slider 50 to an outside member.

Figure 2A:
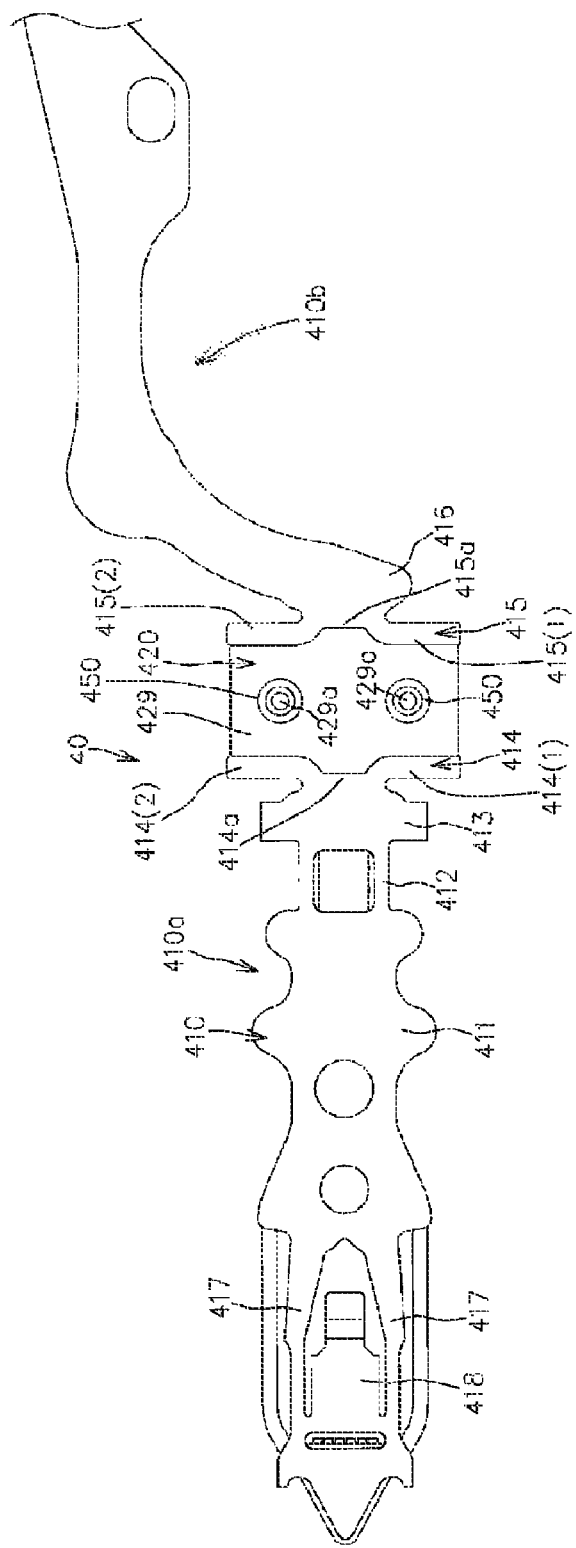
FIG. 2A is a top view of flexure part of the magnetic head suspension according to the first embodiment.
Figure 2B:
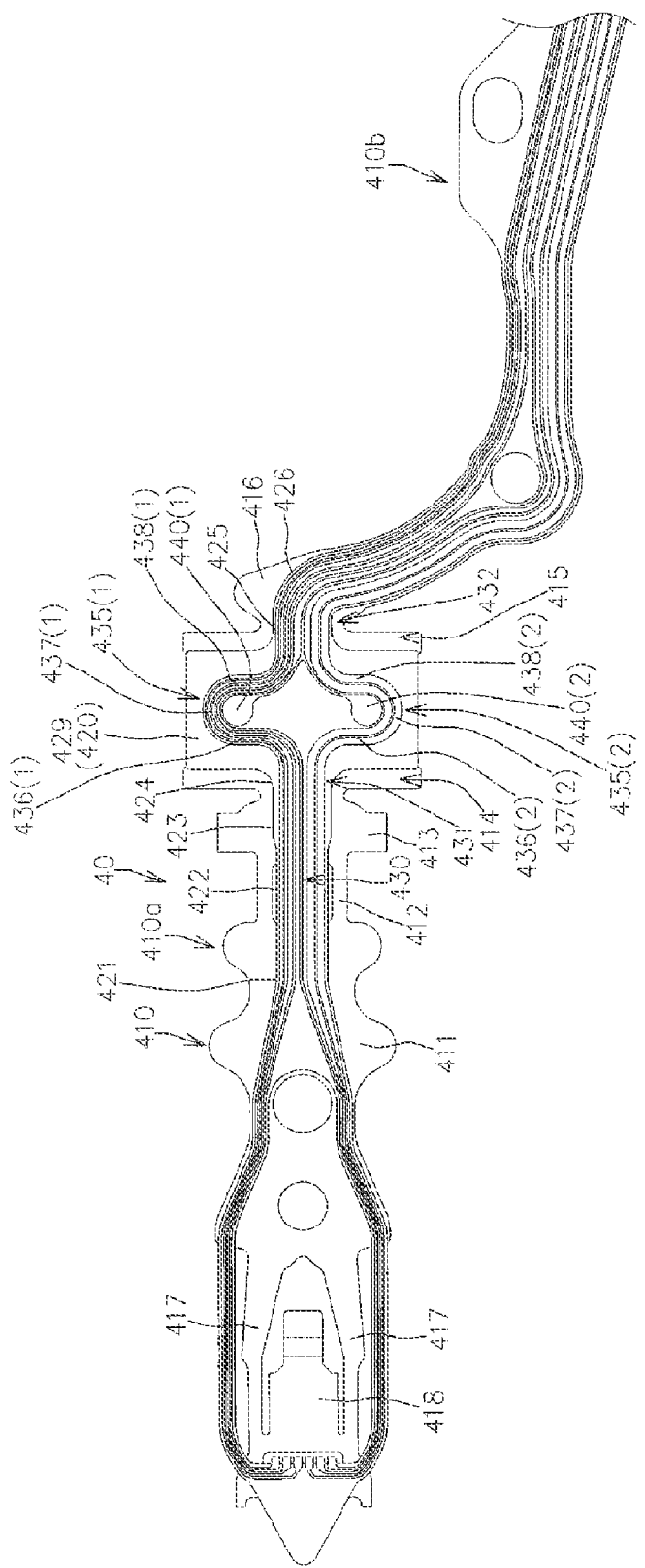
FIG. 2B is a bottom view of the flexure part.

FIGS. 2A and 2B are a top view and a bottom view of the flexure part 40, respectively.

As shown in FIGS. 1B, 2A and 2B, the flexure part 40 includes a flexure metal plate 410 welded to disk-facing surfaces of the load beam part 30 and the supporting part 10, an insulating layer 420 laminated on a disk-facing surface of the flexure metal plate 410, and the signal wiring 430 laminated on a disk-facing surface of the insulating layer 420.

Preferably, the flexure part 40 may include a cover layer (not shown) enclosing the signal wiring 430.

The flexure metal plate 410 includes a load beam part-overlapped region 411, a supporting part-distal side-overlapped region 413, a load bending part-corresponding part 412 and a supporting part-proximal side-overlapped region 416. The load beam part-overlapped region 411 is welded to the disk-facing surface of the load beam part 30 while being overlapped therewith. The supporting part-distal side-overlapped region 413 is welded to the disk-facing surface of the distal end section 12 while being overlapped therewith between the paired leaf springs 21 in the suspension width direction. The load bending part-corresponding part 412 connects the load beam part-overlapped region 411 and the supporting part-distal side-overlapped region 413 between the paired leaf springs 21 in the suspension width direction. The supporting part-proximal side-overlapped region 416 is welded to the disk-facing surface of the proximal end section 11 while being overlapped therewith. The flexure metal plate 410 includes a distal end side-center-support plate forming region 414 and a proximal end side-center-support plate forming region 415. The distal end side-center-support plate forming region 414 extends from the supporting part-distal side-overlapped region 413 so as to be positioned within the open section 13. The proximal end side-center-support plate forming region 415 extends from the supporting part-proximal side-overlapped region 416 so as to be positioned within the open section 13 in a state of being away from the distal end side-center-support plate forming region 414 in the suspension longitudinal direction.

The flexure metal plate 410 further includes paired supporting pieces 417 that extends toward the distal side from both sides of the load beam part-overlapped region 411 in the suspension width direction, and the head-mounting region 418 supported by the supporting pieces 417.

The head-mounting region 418 supports the magnetic head slider 50 at its disk-facing surface that faces the disk surface, as shown in FIG. 1B.

As described above, the protrusion 33 is brought into contact with the upper surface of the head-mounting region 418, so that the head-mounting region 418 could sway flexibly in a roll direction and in a pitch direction, with the protrusion 33 functioning as a fulcrum.

The flexure metal plate 410 has rigidity lower than that of a member (the load beam substrate in the present embodiment) forming the load beam part 30, so that the head-mounting region 418 could sway in the roll direction and in the pitch direction.

The flexure metal plate 410 may be made from, for example, a stainless plate having a thickness of 0.01 mm to 0.025 mm.

As described above, the flexure metal plate 410 is divided in the suspension longitudinal direction between the distal end side-center-support plate forming region 414 and the proximal end side-center-support plate forming region 415.

More specifically, as shown in FIGS. 2A and 2B, the flexure metal plate 410 has a distal side section 410a including the head-mounting region 418, the paired supporting pieces 417, the load beam part-overlapped region 411, the load bending part-corresponding part 412, the supporting part-distal side-overlapped region 413 and the distal end side-center-support plate forming region 414, and a proximal side section 410b including the proximal end side-center-support plate forming region 415 and the supporting part-proximal side-overlapped region 416. The distal side section 410a and the proximal side section 410b are away from each other between the distal end side-center-support plate forming region 414 and the proximal end side-center-support plate forming region 415.

The distal end side-center-support plate forming region 414 and the proximal end side-center-support plate forming region 415 are connected to each other through the insulating layer 420.

More specifically, as shown in FIG. 2B, the insulating layer 420 includes a load beam part-corresponding region 421, a load bending part-corresponding 422, a supporting part-distal side-corresponding region 423, a distal end side-center-support plate corresponding region 424, a proximal end side-center-support plate corresponding region 425 and a supporting part-proximal side-corresponding region 426 that are laminated on the disk-facing surfaces of the load beam part-overlapped region 411, the load bending part-corresponding part 412, the supporting part-distal side-overlapped region 413, the distal end side-center-support plate forming region 414, the proximal end side-center-support plate forming region 415 and the supporting part-proximal side-overlapped region 416 of the flexure metal plate 410, respectively. The insulating layer 420 further includes a connecting region 429 (see also FIGS. 1B and 2A) that connects the distal end side-center-support plate corresponding region 424 and the proximal end side-center-support plate corresponding region 425.

As shown in FIG. 1B, the magnetic head suspension according to the present embodiment further includes paired right and left first and second-distal side-metal plates 100(1), 100(2) that are fixed to the disk-facing surface of the distal end section 12, and paired right and left first and second-proximal side-metal plates 150(1), 150(2) that are fixed to the disk-facing surface of the proximal end section 11, in addition to the various components.

FIG. 3 is a top view of the magnetic head suspension 1A in a state where the paired first and second piezoelectric elements 60(1), 60(2) have been removed.

In FIG. 3, the paired first and second piezoelectric elements 60(1), 60(2) are shown with chain double-dashed line.

As shown in FIGS. 1B and 3, each of the paired first and second-distal side-metal plates 100(1), 100(2) includes a distal end side-fixed region 101 and a distal end side-lateral-support plate forming region 105. The distal end side-fixed region 101 is overlapped with and fixed to a portion of the disk-facing surface of the distal end section 12 that is positioned on an outer side of the supporting part-distal side-overlapped region 413 in the suspension width direction. The distal end side-lateral-support plate forming region 105 extends from the distal end side-fixed region 101 so as to be positioned on an outer side of the distal end side-center-support plate forming region 414 in the suspension width direction within the open section 13.

More specifically, as shown in FIGS. 2A and 3, the distal end side-center-support plate forming region 414 includes a distal end side-center portion 414a extending from the supporting part-distal side-overlapped region 413 toward the proximal side of the suspension, a distal end side-first width portion 414(1) extending from the distal end side-center portion 414a toward one side in the suspension width direction, and a distal end side-second width portion 414(2) extending from the distal end side-center portion 414a toward the other one side in the suspension width direction.

As shown in FIGS. 1B and 3, the first-distal side-metal plate 100(1) includes the distal end side-fixed region 101 brought into contact with and welded to the portion of the disk-facing surface of the distal end section 12 that is positioned on the one side of the supporting part-distal side-overlapped region 413 of the flexure metal plate 410 in the suspension width direction, and the distal end side-lateral-support plate forming region 105 extending from the distal end side-fixed region 101 so as to be positioned on the one side of the distal end side-first width portion 414(1) in the suspension width direction and along the suspension width direction.

The distal end side-lateral-support plate forming region 105 of the first-distal side-metal plates 100(1) cooperates with the distal end side-first width portion 414(1) to form a first piezoelectric element-distal end side-support plate on which the distal end side of the first piezoelectric element 60(1) is mounted.

The second-distal side-metal plate 100(2) is symmetrical to the first-distal side-metal plates 100(1) with the suspension longitudinal center line CL as a reference.

More specifically, the second-distal side-metal plates 100(2) includes the distal end side-fixed region 101 brought into contact with and welded to the portion of the disk-facing surface of the distal end section 12 that is positioned on the other one side of the supporting part-distal side-overlapped region 413 of the flexure metal plate 410 in the suspension width direction, and the distal end side-lateral-support plate forming region 105 extending from the distal end side-fixed region 101 so as to be positioned on the other one side of the distal end side-second width portion 414(2) in the suspension width direction and along the suspension width direction.

The distal end side-lateral-support plate forming region 105 of the second-distal side-metal plates 100(2) cooperates with the distal end side-second width portion 414(2) to form a second piezoelectric element-distal end side-support plate on which the distal end side of the second piezoelectric element 60(2) is mounted.

The distal end side-first and second width portions 414(1), 414(2) are symmetrical to each other with the suspension longitudinal center line CL as a reference. Accordingly, the first and second piezoelectric element-distal end side-support plates are symmetrical to each other with the suspension longitudinal center line CL as a reference.

As shown in FIGS. 1B and 3, each of the paired first and second-proximal side-metal plates 150(1), 150(2) includes a proximal end side-fixed region 151 and a proximal end side-lateral-support plate forming region 155. The proximal end side-fixed region 151 is overlapped with and fixed to a portion of the disk-facing surface of the proximal end section 11 that is positioned on an outer side of the supporting part-proximal side-overlapped region 416 in the suspension width direction. The proximal end side-lateral-support plate forming region 155 extends from the proximal end side-fixed region 151 so as to be positioned on an outer side of the proximal end side-center-support plate forming region 415 in the suspension width direction within the open section 13.

More specifically, as shown in FIGS. 2A and 3, the proximal end side-center-support plate forming region 415 includes a proximal end side-center portion 415a extending from the supporting part-proximal side-overlapped region 416 toward the distal side of the suspension, a proximal end side-first width portion 415(1) extending from the proximal end side-center portion 415a toward one side in the suspension width direction, and a proximal end side-second width portion 415(2) extending from the proximal end side-center portion 415a toward the other one side in the suspension width direction.

As shown in FIGS. 1B and 3, the first-proximal side-metal plates 150(1) includes the proximal end side-fixed region 151 brought into contact with and welded to the portion of the disk-facing surface of the proximal end section 11 that is positioned on the one side of the supporting part-proximal side-overlapped region 416 of the flexure metal plate 410 in the suspension width direction, and the proximal end side-lateral-support plate forming region 155 extending from the proximal end side-fixed region 151 so as to be positioned on the one side of the proximal end side-first width portion 415(1) in the suspension width direction and along the suspension width direction.

The proximal end side-lateral-support plate forming region 155 of the first-proximal side-metal plates 150(1) cooperates with the proximal end side-first width portion 415(1) to form a first piezoelectric element-proximal end side-support plate on which the proximal end side of the first piezoelectric element 60(1) is mounted.

The second-proximal side-metal plate 150(2) is symmetrical to the first-proximal side-metal plates 150(1) with the suspension longitudinal center line CL as a reference.

More specifically, the second-proximal side-metal plates 150(2) includes the proximal end side-fixed region 151 brought into contact with and welded to the portion of the disk-facing surface of the proximal end section 11 that is positioned on the other one side of the supporting part-proximal side-overlapped region 416 of the flexure metal plate 410 in the suspension width direction, and the proximal end side-lateral-support plate forming region 155 extending from the proximal end side-fixed region 151 so as to be positioned on the other one side of the proximal end side-second width portion 415(2) in the suspension width direction and along the suspension width direction.

The proximal end side-lateral-support plate forming region 155 of the second-proximal side-metal plates 150(2) cooperates with the proximal end side-second width portion 415(2) to form a second piezoelectric element-proximal end side-support plate on which the proximal end side of the second piezoelectric element 60(2) is mounted.

The proximal end side-first and second width portions 415(1), 415(2) are symmetrical to each other with the suspension longitudinal center line CL as a reference. Accordingly, the first and second piezoelectric element-proximal end side-support plates are symmetrical to each other with the suspension longitudinal center line CL as a reference.

Each of the first and second piezoelectric elements 60(1), 60(2) has a main body made of PZT (lead zirconate titanate) and a lower electrode layer and an upper electrode layer disposed on a lower surface (a surface closer to the disk surface) and an upper surface (a surface opposite from the disk surface) of the main body.

The main body is 0.05 mm to 0.3 mm thick, for example, and the electrode layers are each made of Ag or Au so as to have a thickness from 0.05 μm to several μm.

The paired piezoelectric elements 60(1), 60(2) are arranged in such a manner as that one of them expands and the other one of them contracts in accordance with application of a voltage so that they function as a sub actuator for causing the magnetic head slider 50 to perform micro motion in the seek direction.

Figure 4:
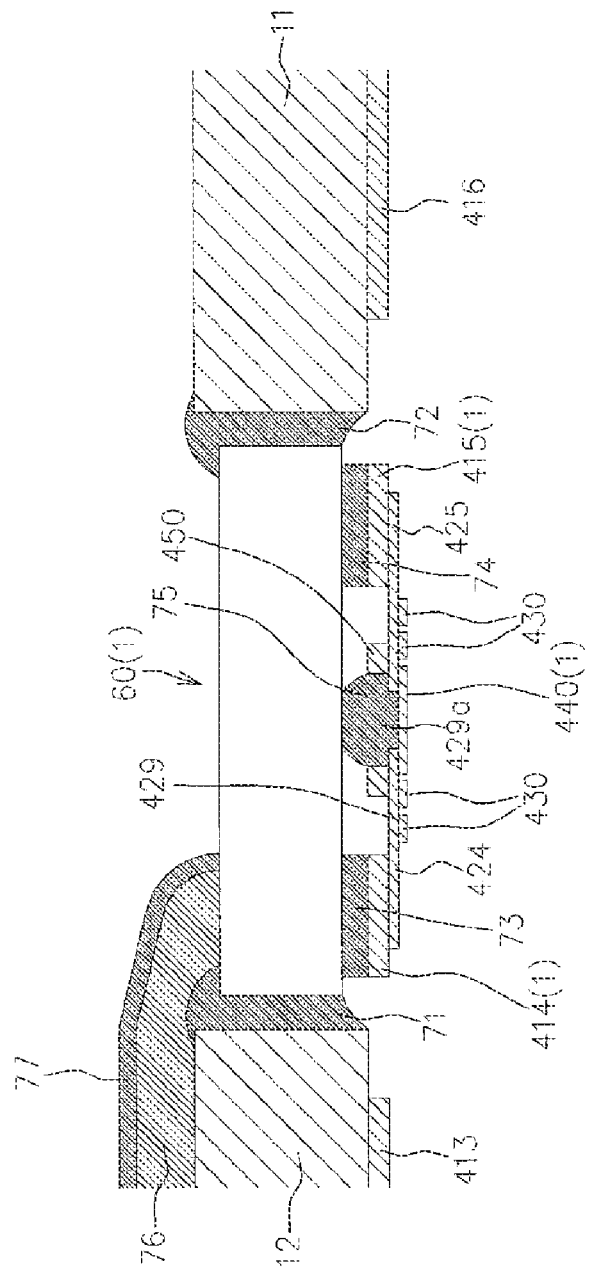
FIG. 4 is a cross sectional view taken along line IV-IV in FIG. 1A.
Figure 5:
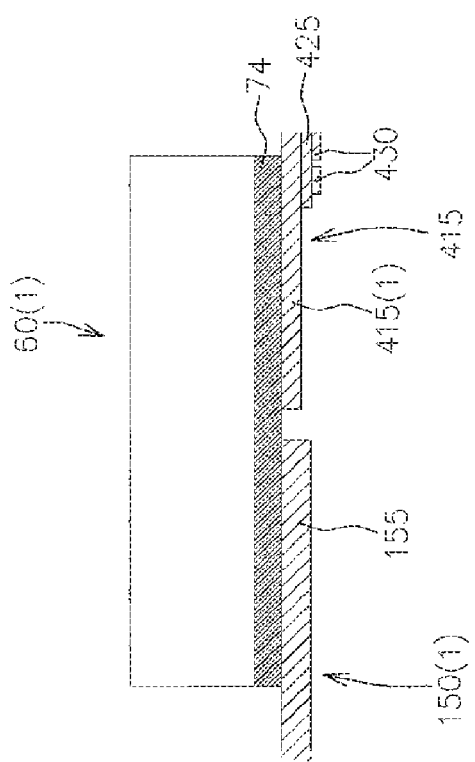
FIG. 5 is a cross sectional view taken along line V-V in FIG. 1A.
Figure 6:
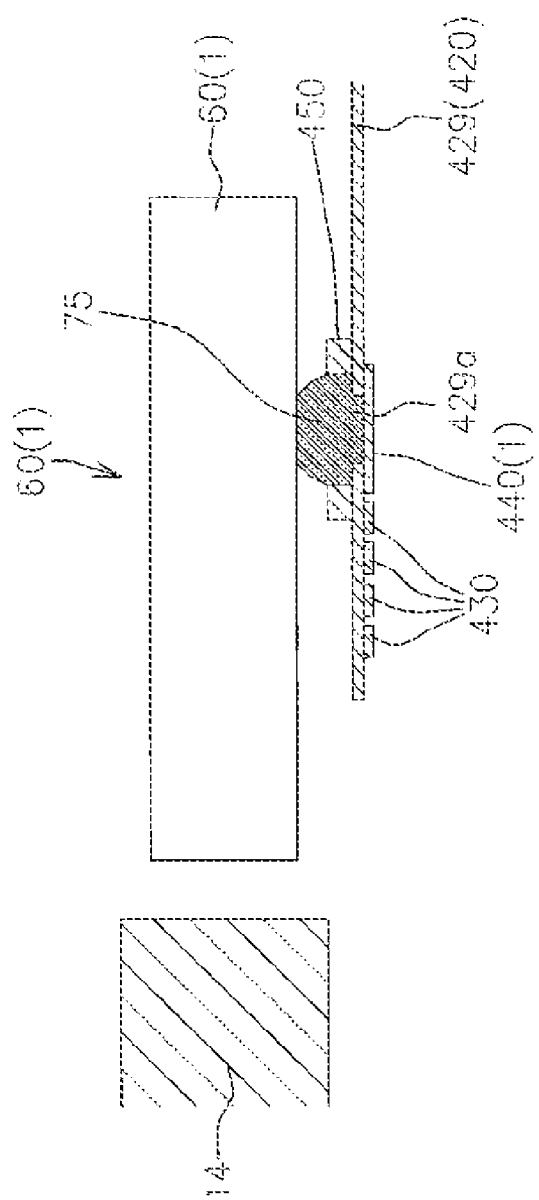
FIG. 6 is a cross sectional view taken along line VI-VI in FIG. 1A.

FIGS. 4 to 6 are cross sectional views taken along lines IV-IV, V-V, VI-VI in FIG. 1A, respectively.

As shown in FIGS. 1A and 4-6, the first and second piezoelectric elements 60(1), 60(2) are mounted to the supporting part 10 so as to be wholly positioned within the open section 13 in a plan view as viewed along the direction orthogonal to the disk surface.

More specifically, as shown in FIGS. 1A and 4-6, the first piezoelectric element 60(1) has a distal side-end surface and a proximal-side end surface that face a proximal side-end surface of the distal end section 12 and a distal side-end surface of the proximal end section 11, respectively, with end surface side-insulative adhesive agents 71, 72 being interposed. The first piezoelectric element 60(1) also has the disk-facing surface that includes a distal side mounted on the first piezoelectric element-distal end side-support plate 414(1), 105 with a distal side-insulative adhesive agent 73 being interposed, and a proximal side mounted on the first piezoelectric element-proximal end side-support plate 415(1), 155 with a proximal side-insulative adhesive agent 74 being interposed.

Similarly, as shown in FIG. 1A, the second piezoelectric element 60(2) has a distal side-end surface and a proximal-side end surface that face the proximal side-end surface of the distal end section 12 and the distal side-end surface of the proximal end section 11, respectively, with the end surface side-insulative adhesive agents 71, 72 being interposed. The second piezoelectric element 60(2) also has the disk-facing surface that includes a distal side mounted on the second piezoelectric element-distal end side-support plate 414(2), 105 with a distal side-insulative adhesive agent being interposed, and a proximal side mounted on the second piezoelectric element-proximal end side-support plate 415(2), 155 with a proximal side-insulative adhesive agent being interposed.

The thus configured magnetic head suspension 1A makes it possible to form the first piezoelectric element-distal end side-support plate 414(1), 105 and the first piezoelectric element-proximal end side-support plate 415(1), 155 on which the distal side and the proximal side of the disk-facing surface of the first piezoelectric element 60(1) are mounted, respectively, and the second piezoelectric element-distal end side-support plate 414(2), 105 and the second piezoelectric element-proximal end side-support plate 415(2), 155 on which the distal side and the proximal side of the disk-facing surface of the second piezoelectric element 60(2) are mounted, respectively, without three members being overlapped with and fixed to by welding one another.

Accordingly, it is possible to reduce the thickness and the weight of the magnetic head suspension 1A, and also prevent a strain that may be caused by welding three members one another, thereby effectively preventing that welding exerts a negative impact on floating posture and vibration characteristics of the magnetic head suspension 1A.

Furthermore, in the present embodiment, the flexure metal plate 410, the paired distal end side-metal plates 100(1), 100(2) and the paired proximal end side-metal plates 150(1), 150(2) are fixed to the supporting part 10 by welding in a state where their upper surfaces (the surfaces opposite from the disk-facing surfaces) are brought into contact with the disk-facing surface of the supporting part 10.

According to the configuration, surfaces on which the paired piezoelectric elements 60(1), 60(2) are mounted, that is, the upper surfaces (the surfaces opposite from the disk-facing surfaces) of the distal end side-first and second width portions 414(1), 414(2), the distal end side-lateral-support plate forming region 105, the proximal end side-first and second width portions 415(1), 415(2), and the proximal end side-lateral-support plate forming region 155 are positioned on a same plane (a plane on which the disk-facing surface of the supporting part 10 is positioned), thereby enhancing stabilization of the posture of the piezoelectric elements 60(1), 60(2).

By the way, in order to enhance reactivity of micro motion in the seek direction of the magnetic head suspension 50 by the paired piezoelectric elements 60(1), 60(2), it is needed that the paired piezoelectric elements 60(1), 60(2) expand and contract smoothly.

In this regard, the magnetic head suspension 1A according to the present embodiment includes a following configuration.

First of all, as described earlier, the distal end side-center-support plate forming region 414 of the flexure metal plate 410 forming a part of the first and second piezoelectric element-distal end side-supports is away in the suspension longitudinal direction from the proximal end side-center-support plate forming region 415 of the flexure metal plate 410 forming a part of the first and second piezoelectric element-proximal end side-support plates in a state of being connected to the proximal end side-center-support plate forming region 415 by the connecting region 429 of the insulting layer 420 that is flexible.

Second, the paired first and second-distal side-metal plates 100(1), 100(2) forming parts of the first and second piezoelectric element-distal end side-supports are away in the suspension longitudinal direction from the first and second-proximal side-metal plates 150(1), 150(2) forming parts of the first and second piezoelectric element-proximal end side-support plates.

That is, the distal end side-support plate and the proximal end side-support plate are connected to each other by a low rigidity member (the insulting layer 420 and the signal wiring 430 in the present embodiment) in a state where the flexure metal plate 410 does not exist between the both support plates.

Accordingly, the distal end side-support plate could be moved in the suspension longitudinal direction relatively free with respect to the corresponding distal end side-support plate in accordance with the expansion and contraction motion of the paired piezoelectric elements 60(1), 60(2).

As explained above, in the present embodiment, the flexure part 40 integrally includes the signal wiring 430 for electrically connecting the magnetic head slider 50 to an outside member.

The signal wiring 430 extends in the suspension longitudinal direction across the connecting region 429 of the insulating layer 420, as shown in FIGS. 1B and 2B.

Therefore, the signal wiring 430 may be a resistance against the expansion and contraction motion of the paired piezoelectric elements 60(1), 60(2).

The magnetic head suspension 1A according to the present embodiment has a following configuration in order to reduce the resistance as much as possible.

That is, as shown in FIGS. 1B and 2B, the signal wiring 430 includes an open section-distal side portion 431 extending along the suspension longitudinal direction across a distal edge of the open section 13, an open section-proximal side portion 432 extending along the suspension longitudinal direction across a proximal edge of the open section 13, and an open section-center portion 435 connecting the open section-distal side portion 431 and the open section-proximal side portion 432.

The open section-distal side portion 431 and the open section-proximal side portion 432 are positioned at a center in the suspension width direction and extend along the suspension longitudinal direction.

The open section-center portion 435 includes first and second open section-center portions 435(1), 435(2) that are parted from each other in right and left sides with the suspension longitudinal center line CL as a reference.

The first and second open section-center portions 435(1), 435(2) are made to be symmetrical to each other with the suspension longitudinal center line CL as a reference to the extent possible.

As shown in FIG. 2B, the first open section-center portions 435(1) has a U-like shape in a plan view that includes a first distal side-width direction extending portion 436(1), a first proximal side-width direction extending portion 438(1) and a first curved portion 437(1). The first distal side-width direction extending portion 436(1) extends from a proximal end of the open section-distal side portion 431 to a first side in the suspension width direction. The first proximal side-width direction extending portion 438(1) extends from a distal end of the open section-proximal side portion 432 to the first side in the suspension width direction. The first curved portion 437(1) connects outer ends in the suspension width direction of the first distal and proximal side-width direction extending portions 436(1), 438(1) and is formed into a convex shape toward the first side in the suspension with direction.

The second open section-center portions 435(2) has a U-like shape in a plan view that includes a second distal side-width direction extending portion 436(2), a second proximal side-width direction extending portion 438(2) and a second curved portion 437(2). The second distal side-width direction extending portion 436(2) extends from the proximal end of the open section-distal side portion 431 to a second side opposite from the first side in the suspension width direction. The second proximal side-width direction extending portion 438(2) extends from the distal end of the open section-proximal side portion 432 to the second side in the suspension width direction. The second curved portion 437(2) connects outer ends in the suspension width direction of the second distal and proximal side-width direction extending portions 436(2), 438(2) and is formed into a convex shape toward the second side in the suspension with direction.

As explained above, out of the signal wiring 430, the open section-center portion 435 that is positioned between the distal end side-support plate and the proximal end side-support plate in the suspension longitudinal direction is formed into the U-like shape in a plan view that is convex facing outward in the suspension width direction. The configuration makes it possible to reduce the rigidity of the signal wiring 430 with respect to the suspension longitudinal direction that is a direction along with the paired piezoelectric elements 60(1), 60(2) expand and contract, thereby preventing the signal wiring 430 from being a resistance against the expansion and contraction motion of the paired piezoelectric elements 60(1), 60(2) as much as possible.

The connecting region 429 of the insulting layer 420 has such a length in the suspension width direction as to at least partially overlap with the paired piezoelectric elements 60(1), 60(2) in a plan view in order to secure insulation of the open section-center portion 435 against the paired piezoelectric elements 60(1), 60(2).

Further, the magnetic head suspension 1A according to the present embodiment is configured so as to supply voltage to the paired piezoelectric elements 60(1), 60(2) through first and second voltage supply wirings 440(1), 440(2) that are laminated on the insulating layer 420 of the flexure part 40.

More specifically, on the disk-facing surface of the insulting layer 420 of the flexure part 40, the first and second voltage supply wirings 440(1), 440(2) are laminated in addition to the signal wiring 430.

As shown in FIGS. 1B and 2B, the first voltage supply wiring 440(1) has a proximal end (not shown) capable of being connected to an outside voltage supply source and a distal end overlapped with the corresponding first piezoelectric element 60(1) in a plan view.

Similarly, the first voltage supply wiring 440(2) has a proximal end (not shown) capable of being connected to the voltage supply source and a distal end overlapped with the corresponding second piezoelectric element 60(2) in a plan view.

The connecting region 429 of the insulating layer 420 is at least partially overlapped with the first and second piezoelectric elements 60(1), 60(2) in a plan view as viewed along the direction orthogonal to the disk surface.

Further, as shown in FIGS. 4 and 6, the connecting region 429 is formed with openings 429a at positions corresponding to the distal ends of the first and second voltage supply wirings 440(1), 440(2). The distal ends of the first and second voltage supply wirings 440(1), 440(2) are electrically connected to the lower electrode layers of the corresponding piezoelectric elements 60(1), 60(2) through lower surface side-conductive adhesive agents 75 that are disposed so as to pass through the openings 429a.

As shown in FIG. 4, the upper electrode layers of the piezoelectric elements 60(1), 60(2) are electrically connected to the supporting part 10 through upper surface side-conductive adhesive agents 76 to have a ground potential.

Preferably, the upper surface side-conductive adhesive agent 76 may be surrounded with a cover insulative adhesive 77, as shown in FIGS. 1A and 4.

In a preferably configuration, as shown in FIGS. 2A, 3, 4 and 6, the connecting region 129 of the flexure part 40 is provided with a metal ring 450 on a surface opposite from the disk-facing surface so as to surround the lower surface side-conductive adhesive agent 75.

The provision of the metal ring 450 makes it possible to suppress the spreading of the lower surface side-conductive adhesive agent 75, thereby reliably securing electric connection between the lower electrode layer of the piezoelectric element 60(1), 60(2) and the first or second voltage supply wiring 440(1), 440(2) due to the lower surface side-conductive adhesive agent 75. Furthermore, the metal ring 450 can effectively prevent the conductive agent 75 from spreading and running into the insulative adhesive agents 73, 74.

The metal ring 450 may be formed with utilizing a metal substrate for forming the flexure metal plate 410.

More specifically, the flexure metal plate 410 is formed by laminating the insulting layer 120 on a disk-facing surface of the metal substrate and then removing unnecessary portions from the metal substrate by etching. The metal ring 450 is easily formed by performing the etching in such a manner as that the metal ring 450 as well as the flexure metal plate 410 remains.

Figure 7:
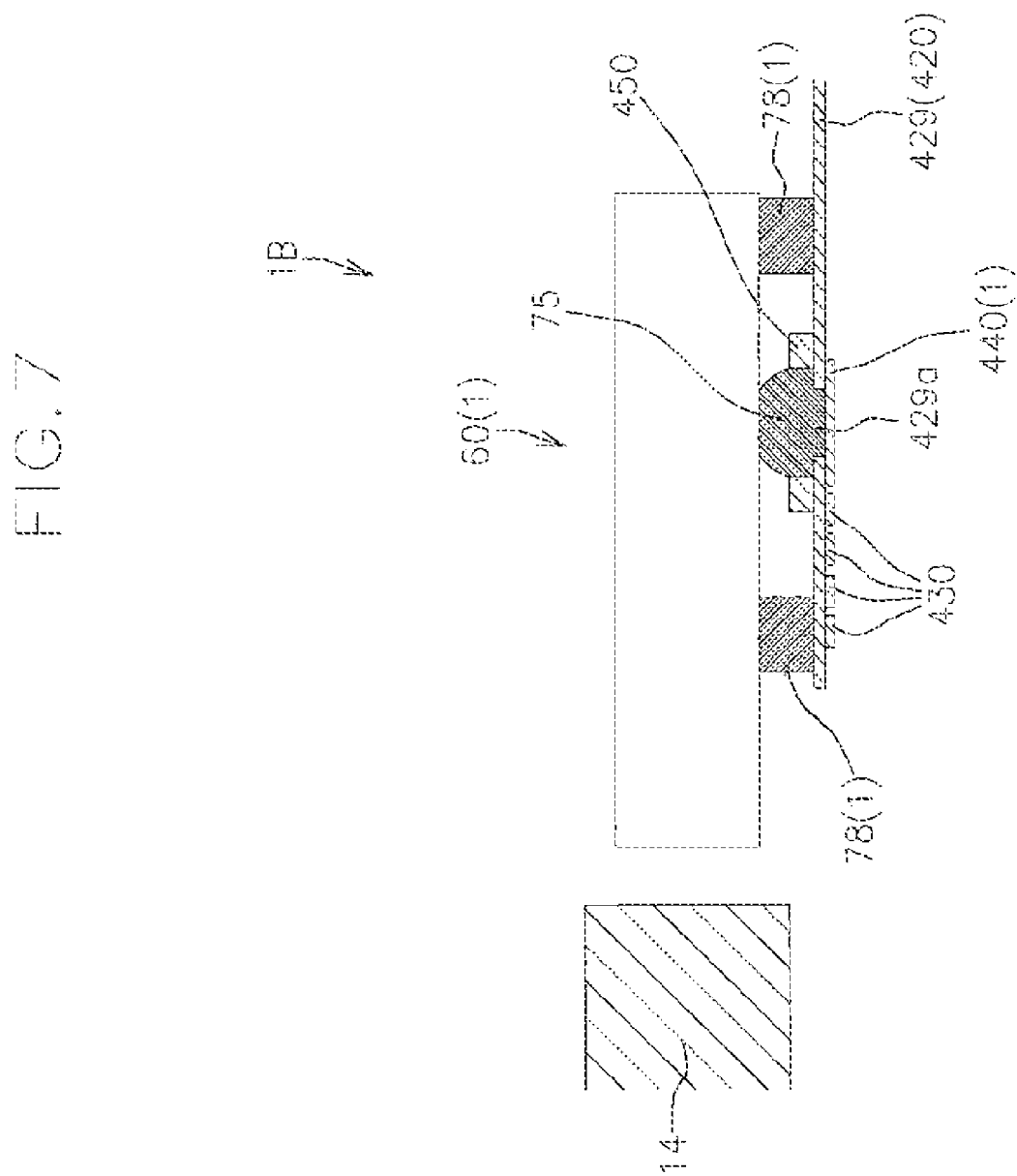
FIG. 7 is a cross sectional view of a magnetic head suspension according to a first modified example of the first embodiment, and shows a cross section along a cut line corresponding to the line VI-VI in FIG. 1A.

FIG. 7 is a cross sectional view of a magnetic head suspension 1B according to a first modified example of the present embodiment, and shows a cross section along a cut line corresponding to the line VI-VI in FIG. 1A.

In FIG. 7, the members same as those in the present embodiment are denoted by the same reference numerals.

As shown in FIG. 7, the magnetic head suspension 1B according to the first modified example is different from the magnetic head suspension 1A in that the suspension 1A further includes paired first sealed space forming-insulative adhesive agents 78(1) disposed on both sides in the suspension width direction of the lower surface side-conductive adhesive agent 75 for the first piezoelectric element, and paired second sealed space forming-insulative adhesive agents (not shown) disposed on both sides in the suspension width direction of the lower surface side-conductive adhesive agent for the second piezoelectric element.

The paired first sealed space forming-insulative adhesive agents 78(1) extends in the suspension longitudinal direction between the end surface side-insulative adhesive agents 71, 72 in a state of bridging a space between the insulting layer 420 and the lower electrode layer of the first piezoelectric element 60(1) with respect to the direction orthogonal to the disk surface, as shown in FIG. 7.

Similarly, the paired second sealed space forming-insulative adhesive agents extends in the suspension longitudinal direction between the end surface side-insulative adhesive agents 71, 72 in a state of bridging a space between the insulting layer 420 and the lower electrode layer of the second piezoelectric element 60(2) with respect to the direction orthogonal to the disk surface As described above, in the magnetic head suspension 1B according to the first modified example, the lower surface side-conductive adhesive agent 75 is substantially sealed. Accordingly, it is possible to effectively prevent filler particles (mainly Ag particles), which are included in the lower surface side-conductive adhesive agents 75, from falling onto the disk surface, in addition to realizing the effects of the magnetic head suspension 1A according to the present embodiment.

Figure 8:
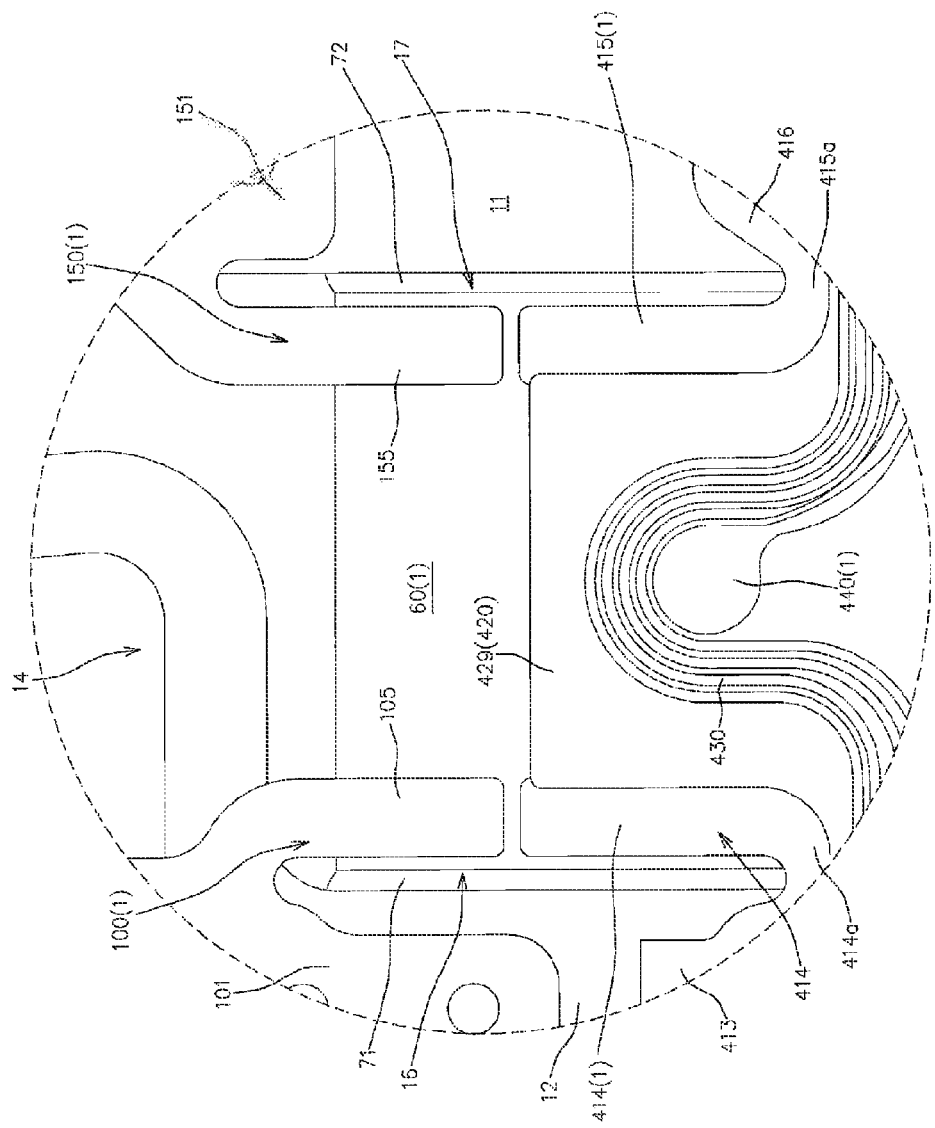
FIG. 8 is an enlarger view of VIII portion in FIG. 1B.

FIG. 8 is an enlarger view of VIII portion in FIG. 1B.

As shown in FIGS. 4 and 8, in the present embodiment, the first piezoelectric element-distal end side-support plate formed by the distal end side-first width portion 414(1) of the distal end side-center-support plate forming region 414 and the distal end side-lateral-support plate forming region 105 of the first-distal side-metal plates 100(1), and the second piezoelectric element-distal end side-support plate formed by the distal end side-second width portion 414(2) of the distal end side-center-support plate forming region 414 and the distal end side-lateral-support plate forming region 105 of the second-distal side-metal plates 100(2) are disposed so that a gap 16 is made between the proximal edge of the distal end section 12 of the supporting part 10 and the both support plates.

The configuration makes it possible to effectively prevent the filler particles, which are included in the end surface side-insulative adhesive agent 71 interposed between the distal side-end surfaces of the first and second piezoelectric elements 60(1), 60(2) and the proximal side-end surface of the distal end section 12, and are also included in the distal side-insulative adhesive agent 73 interposed between the distal sides of the disk-facing surfaces of the first and second piezoelectric elements 60(1), 60(2) and the first and second piezoelectric element-distal end side-support plates, from entering between the supporting part-distal side-overlapped region 413 and the distal end section 12, and also between the distal end side-fixed regions 101 of the first and second-distal side-metal plates 100(1), 100(2) and the distal end section 12.

More specifically, in a case where the first and second piezoelectric element-distal end side-support plates extend in the suspension longitudinal direction across the proximal edge of the distal end section 12, the end surface side-insulative adhesive agent 71 and the distal side-insulative adhesive agent 73 may enter between a support plate including the first and second piezoelectric element-distal end side-support plates and the distal end section 12, which are ideally in intimate contact with each other. The support plate including the first and second piezoelectric element-distal end side-support plates and the distal end section 12, which are ideally in intimate contact with each other, are formed by rigid members such as SUS. Accordingly, if the insulative adhesive agent 70 enters between the support plate and the distal end section 12, the filler particles may get out of the location between the support plate and the distal end section 12 in accordance with the expansion and contraction motion of the paired piezoelectric elements 60(1), 60(2).

On the other hand, such a defect can be effectively prevented in the present embodiment since there is provided the gap 16 between the distal edge of the support plate including the first and second piezoelectric element-distal end side-support plates and the proximal edge of the distal end section 12, as explained above.

For the same reason, in the present embodiment, the first piezoelectric element-proximal end side-support plate formed by the proximal end side-first width portion 415(1) of the proximal end side-center-support plate forming region 415 and the proximal end side-lateral-support plate forming region 155 of the first-proximal side-metal plates 150(1), and the second piezoelectric element-proximal end side-support plate formed by the proximal end side-second width portion 415(2) of the proximal end side-center-support plate forming region 415 and the proximal end side-lateral-support plate forming region of the second-proximal side-metal plates 150(2) are disposed so that a gap 17 (see FIG. 8) is made between the distal edge of the proximal end section 11 of the supporting part 10 and the both support plates.

In the magnetic head suspension 1A according to the present embodiment, as shown in FIG. 1B, the paired first and second-distal side-metal plates 100(1), 100(2) are integrally formed with the load beam part 30 and the load bending part 20.

More specifically, in the magnetic head suspension 1A according to the present embodiment, the load beam part/load bending part component 300 made from the load beam substrate integrally includes the paired distal side-metal plates 100(1), 100(2) as well as the load beam part 30 and the load bending part 20, and forms a suspension distal side-man body 350.

Preferably, the paired first and second-proximal side-metal plates 150(1), 150(2) are also made from the load beam substrate.

Figure 9:
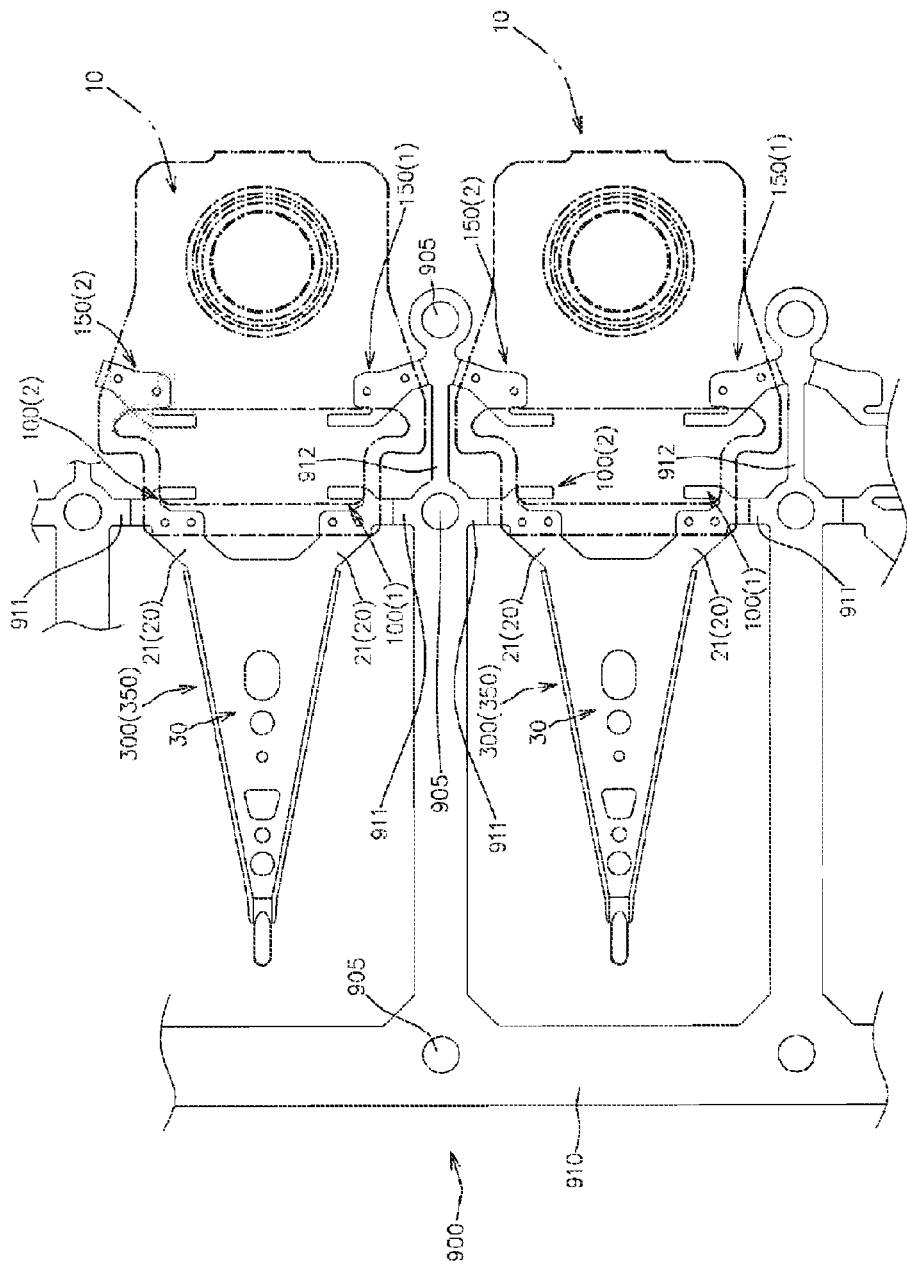
FIG. 9 is a plan view showing a first example of a manufacturing method of the magnetic head suspension according to the first embodiment.

FIG. 9 is a plan view showing a first example of a manufacturing method of the magnetic head suspension 1A.

As shown in FIG. 9, the manufacturing method according to the first example includes a step for forming an intermediate metal sheet 900 from the load beam substrate, the intermediate metal sheet 100 including plural of suspension distal side-man bodies 350 and plural of plate sets corresponding to the plural of the suspension distal side-main bodies 350, each of the plates sets including the first and second-proximal side-metal plates 150(1), 150(2).

The intermediate sheet 900 includes a carrier 910, and the plural suspension distal side-man bodies 350 are dispose in parallel along the suspension width direction in a state of being connected to the carrier 910 through first support pieces 911.

The first and second-proximal side-metal plates 150(1), 150(2) are connected to the carrier 910 through second support pieces 912 in a state of being allocated with respect to the corresponding suspension distal side-man body 350.

In the first example shown in FIG. 9, the second-proximal side-metal plate 150(2) connected to one of the suspension distal side-man bodies 350 that are adjacent to each other and the first-proximal side-metal plate 150(1) of the other one of the adjacent suspension distal side-man bodies 350 are supported by the single second support piece 912.

The method according to the first example includes a step for fixing the suspension distal side-man body 350 and the first and second-proximal side-metal plates 150(1), 150(2) to the supporting part 10 by welding or the like while the suspension distal side-man body 350 and the first and second-proximal side-metal plates 150(1), 150(2) being connected to the carrier 910.

The manufacturing method according to the first example includes a subsequent step for separating an assembly, in which the suspension distal side-man body 350 and the first and second-proximal side-metal plates 150(1), 150(2) are connected to the supporting part 10, from the carrier 910 by cutting the first and second support pieces 911, 912 at respective predetermined positions.

Reference numerals 905 in FIG. 9 denote positioning holes.

The manufacturing method according to the first example includes a step for fixing the flexure part 40 to the assembly by welding or the like after or before the assembly is separated from the carrier 910.

The manufacturing method according to the first example makes it possible to manufacture the magnetic head suspension 1A, in which the first and second-distal side-metal plates 100(1), 100(2) and the first and second-proximal side-metal plates 150(1), 150(2) are away from each other in the suspension longitudinal direction, while improving dimensional accuracy and reducing material cost.

Figure 10:
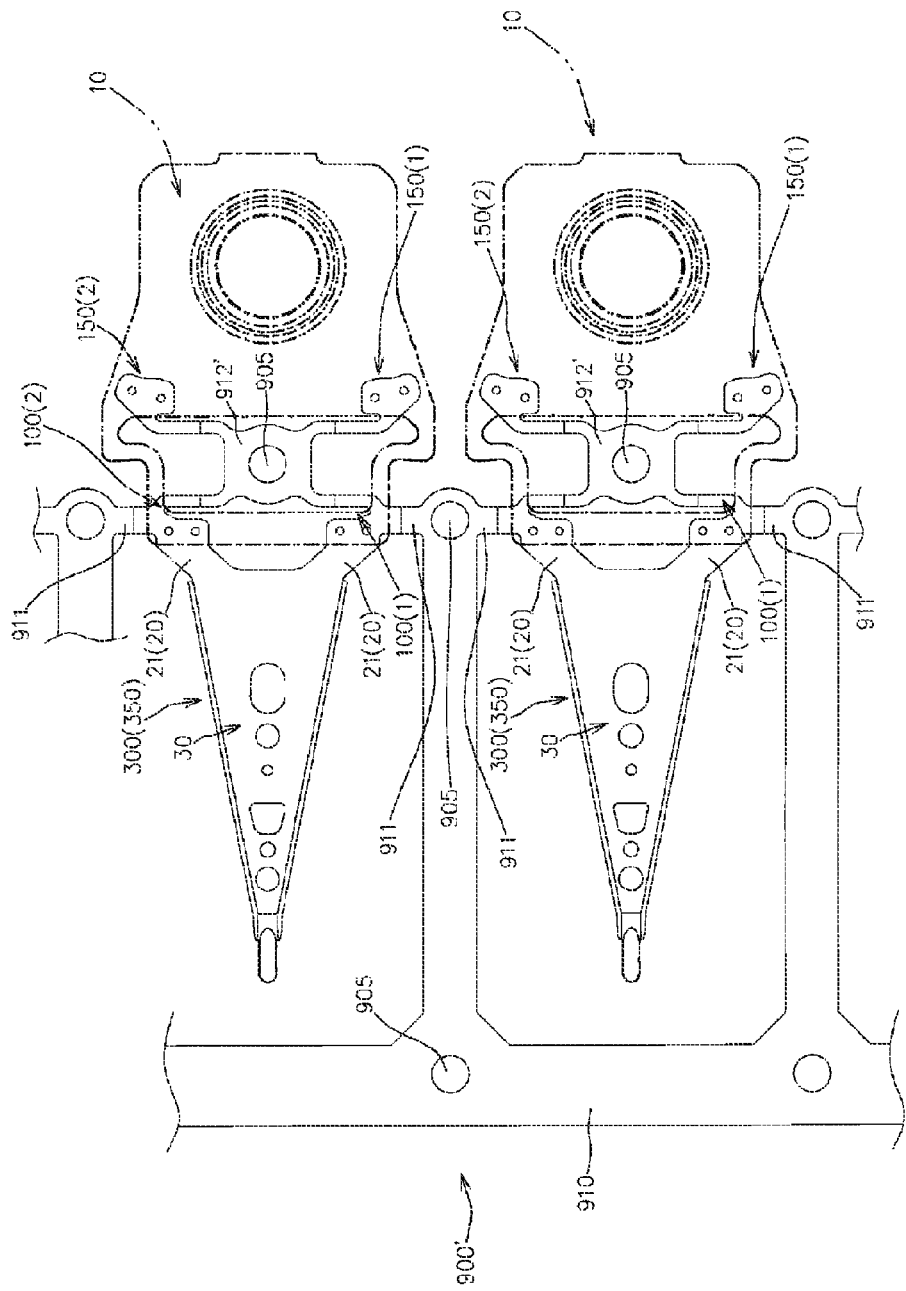
FIG. 10 is a plan view showing a second example of a manufacturing method of the magnetic head suspension according to the first embodiment.

FIG. 10 is a plan view showing a second example of a manufacturing method of the magnetic head suspension 1A.

In FIG. 10, the members same as those in FIG. 9 are denoted by the same reference numerals.

The manufacturing method according to the second example is different from the manufacturing method according to the first example in that the intermediate metal sheet 900 is replaced with an intermediate metal sheet 900'.

As shown in FIG. 10, the intermediate metal sheet 900' is different from the intermediate metal sheet 900 in that the first and second-proximal side-metal plates 150(1), 150(2) are connected to the first and second-distal side-metal plates 100(1), 100(2) through a second support piece 912'.

The manufacturing method according to the second example exerts the same effect as that of the manufacturing method according to the first example.

Although the magnetic head suspension 1A according to the present embodiment is configured so that the flexure metal plate 410 does not exist between the distal end side-center-support plate forming region 414 and the proximal end side-center-support plate forming region 415, the present invention is not limited to the configuration.

Figure 11:
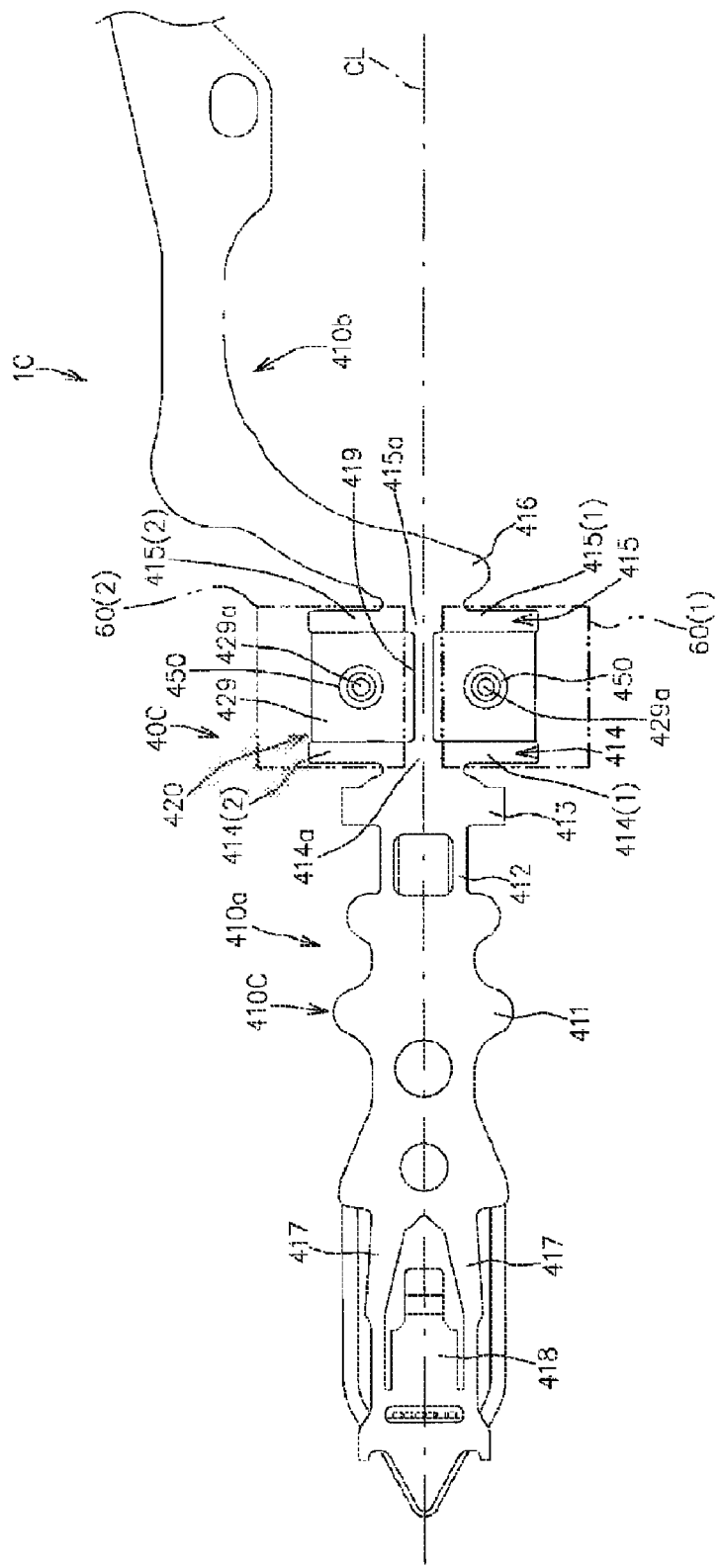
FIG. 11 is a top view of a flexure part of a magnetic head suspension according to a second modified example of the first embodiment.

FIG. 11 is a top view of a flexure part 40C of a magnetic head suspension 1C according to a second modified example of the present embodiment.

FIG. 11 shows the first and second piezoelectric elements 60(1), 60(2) with chain double-dashed line for the purpose of easier understanding.

As explained earlier, in the present embodiment, the distal end side-center-support plate forming region 414 and the proximal end side-center-support plate forming region 415 of the flexure metal plate 410 are away from each other in the suspension longitudinal direction in a state where the flexure metal plate 410 does not exist between both regions, and the both regions are connected to each other through the connecting region 429 of the insulating layer 420 and the signal wiring 430 that have flexibility.

On the other hand, the magnetic head suspension 1C according to the second modified example is different from the magnetic heads suspension 1A according to the present embodiment in that the flexure part 40 is replaced with the flexure part 40C.

The flexure part 40C is different from the flexure part 40 in that it has a flexure metal plate 410C in place of the flexure metal plate 410.

As shown in FIG. 11, the flexure metal plate 410C includes the same components as those of the flexure metal plate 410 in the present embodiment, and further includes a bridge region 419 that is positioned between the paired first and second piezoelectric elements 60(1), 60(2) in the suspension width direction and connects the distal end side-center-support plate forming region 414 and the proximal end side-center-support plate forming region 415.

The thus configured magnetic head suspension 1C can enhance stabilization of the posture of the flexure part 40C while preventing the bridge region 419 from obstructing the expansion and contraction motion of the paired piezoelectric elements 60(1), 60(2) as much as possible.

Second Embodiment

Hereinafter, another embodiment of the magnetic head suspension according to the present invention will be described, with reference to the attached drawings.

Figure 12:
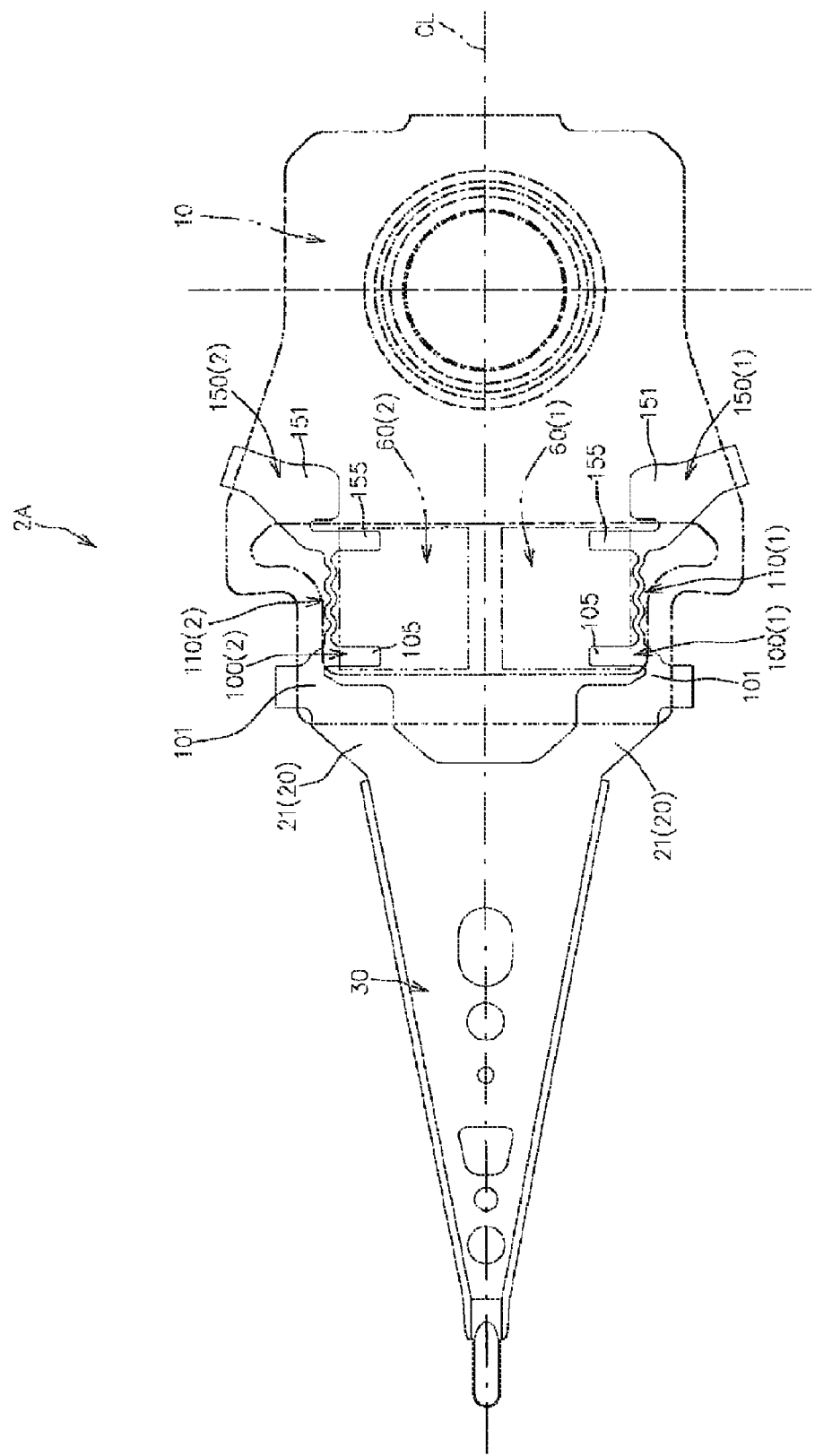
FIG. 12 is a top view of a magnetic head suspension according to a second embodiment of the present invention.

FIG. 12 is a top view (a plan view as viewed from a side opposite from a disk surface) of a magnetic head suspension 2A according to the present embodiment.

In the figure, the members same as those in the first embodiment are denoted by the same reference numerals to omit the detailed description thereof.

Furthermore, for the purpose of easier understanding, the flexure part 40 is not shown, and the supporting part 10 and the first and second piezoelectric elements 60(1), 60(2) are shown with chain double-dashed line in FIG. 12.

As shown in FIG. 12, the magnetic head suspension 2A according to the present embodiment is different from the magnetic head suspension 1A according to the first embodiment in that it further includes a first connecting piece 110(1) that connects the first-distal side-metal plate 100(1) and the first-proximal side-metal plate 150(1), and a second connecting piece 110(2) that connects the second-distal side-metal plate 100(2) and the second-proximal side-metal plate 150 (2).

Each of the first and second connecting pieces 110(1), 110(2) is positioned outward of the corresponding piezoelectric element 60(1), 60(2) with respect to the suspension width direction, and has an accordion shape in a plan view as viewed along the direction orthogonal to the disk surface.

The thus configured magnetic head suspension 2A makes it possible to enhance handleability of the first and second-proximal side-metal plates 150(1), 150(2) during the manufacturing process while preventing the first and second connecting pieces 110(1), 110(2) from obstructing the expansion and contraction motion of the paired piezoelectric elements 60(1), 60(2) as much as possible.

Furthermore, in a case where outer side surfaces of the piezoelectric elements 60(1), 60(2) that are positioned on outer side in the suspension width direction are covered with insulative adhesive agents (not shown), the first and second connecting pieces 110(1), 110(2) can effectively prevent the insulative adhesive agents from flowing out outward in the suspension width direction before the adhesives are cured.

By covering the outer side surfaces of the piezoelectric elements 60(1), 60(2) with the insulative adhesive agents, it is possible to effectively prevent spines of the side surfaces of the electrode layers of the piezoelectric elements 60(1), 60(2) from dropping during the use of the magnetic head suspension, and/or prevent particles of the piezoelectric main bodies from dropping at the time when the piezoelectric elements 60(1), 60(2) are expanded and contracted. The spines may occur at the time when the piezoelectric elements 60(1), 60(2) are taken out from a wafer.

In the present embodiment, the first and second-distal side-metal plates 100(1), 100(2) are integrally formed with the load beam part 30 and the load bending part 20 in the same manner as the first embodiment.

The first connecting piece 110(1) integrally connects the first-distal side-metal plate 100(1) to the first-proximal side-metal plate 150(1), and the second connecting piece 110(2) integrally connects the second-distal side-metal plate 100(2) to the second-proximal side-metal plate 150(2).

More specifically, in the present embodiment, the load beam part 30, the load bending part 20, the paired first and second-distal side-metal plates 100(1), 100(2), the first and second connecting pieces 110(1), 110(2), and the paired first and second-proximal side-metal plates 150(1), 150(2) are integrally formed.

Third Embodiment

Hereinafter, still another embodiment of the magnetic head suspension according to the present invention will be described, with reference to the attached drawings.

Figure 13:
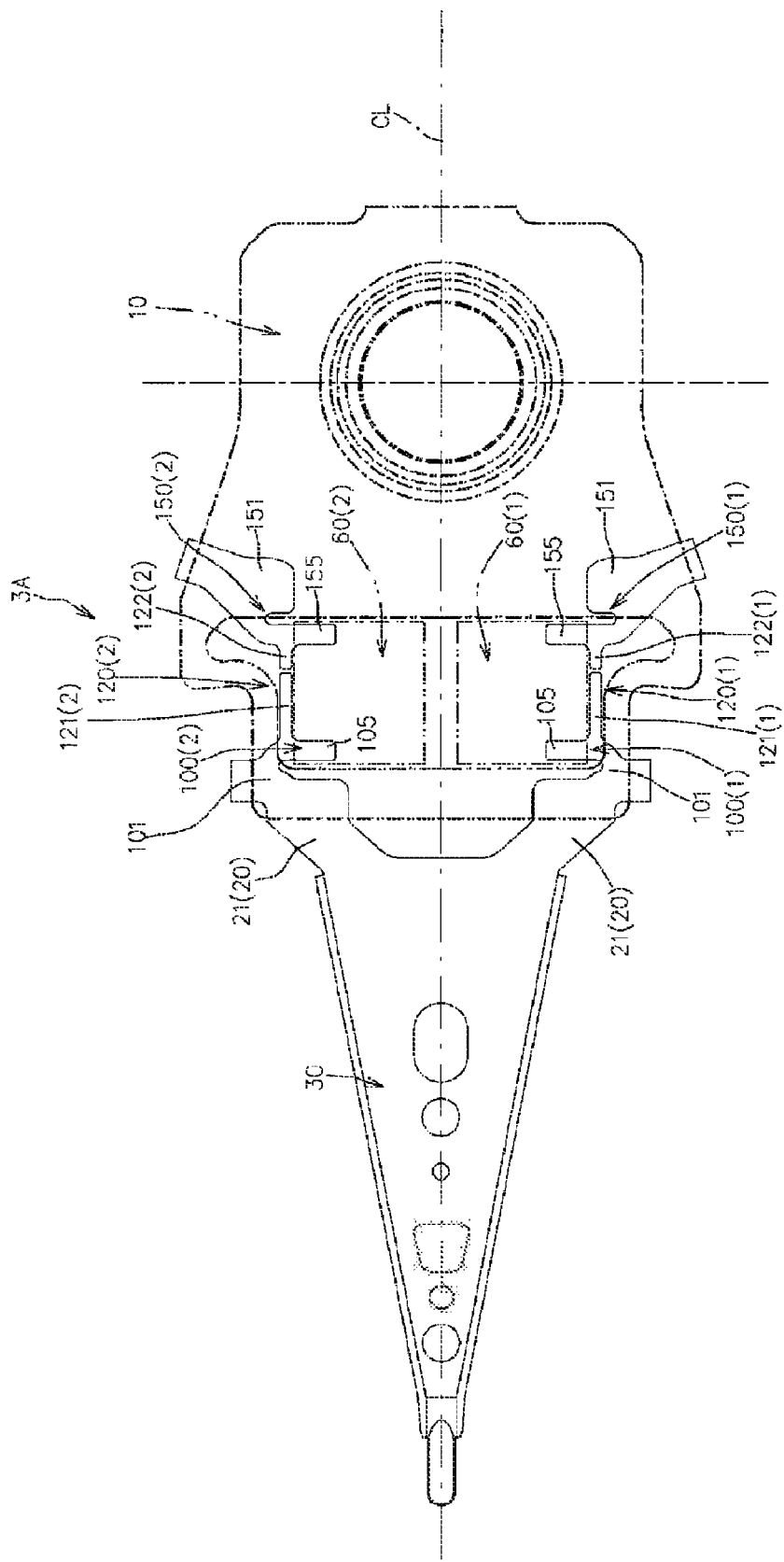
FIG. 13 is a top view of a magnetic head suspension according to a third embodiment of the present invention.

FIG. 13 is a top view (a plan view as viewed from a side opposite from a disk surface) of a magnetic head suspension 3A according to the present embodiment.

In the figure, the members same as those in the first and second embodiments are denoted by the same reference numerals to omit the detailed description thereof.

Furthermore, for the purpose of easier understanding, the flexure part 40 is not shown, and the supporting part 10 and the first and second piezoelectric elements 60(1), 60(2) are shown with chain double-dashed line in FIG. 13.

The magnetic head suspension 3A according to the present embodiment is different from the magnetic head suspensions 1A, 2A according to the first and second embodiments in that it further includes a first extending piece 120(1) that is positioned on an outer side of the first piezoelectric element 60(1) with respect to the suspension width direction and extends along the suspension longitudinal direction, and a second extending piece 120(2) that is positioned on an outer side of the second piezoelectric element 60(2) with respect to the suspension width direction and extends along the suspension longitudinal direction.

The first extending piece 120(1) includes a first distal portion 121(1) connected to the first-distal end side-metal plate 100(1) and a first proximal portion 122(1) connected to the first-proximal end side-metal plate 150(1), wherein the first distal portion 121(1) and the first proximal portion 122(1) face to each other with having a gap between them.

Similarly, the second extending piece 120(2) includes a second distal portion 121(2) connected to the second-distal end side-metal plate 100(2) and a second proximal portion 122(2) connected to the second-proximal end side-metal plate 150(2), wherein the second distal portion 121(2) and the second proximal portion 122(2) face to each other with having a gap between them.

The thus configured magnetic head suspension 3A makes it possible to, in a case where the outer side surfaces of the piezoelectric elements 60(1), 60(2) that are positioned on outer side in the suspension width direction are covered with insulative adhesive agents, effectively prevent the insulative adhesive agents from flowing out outward in the suspension width direction before the adhesives are cured by the first and second extending pieces 120(1), 120(2).

Figure 14:
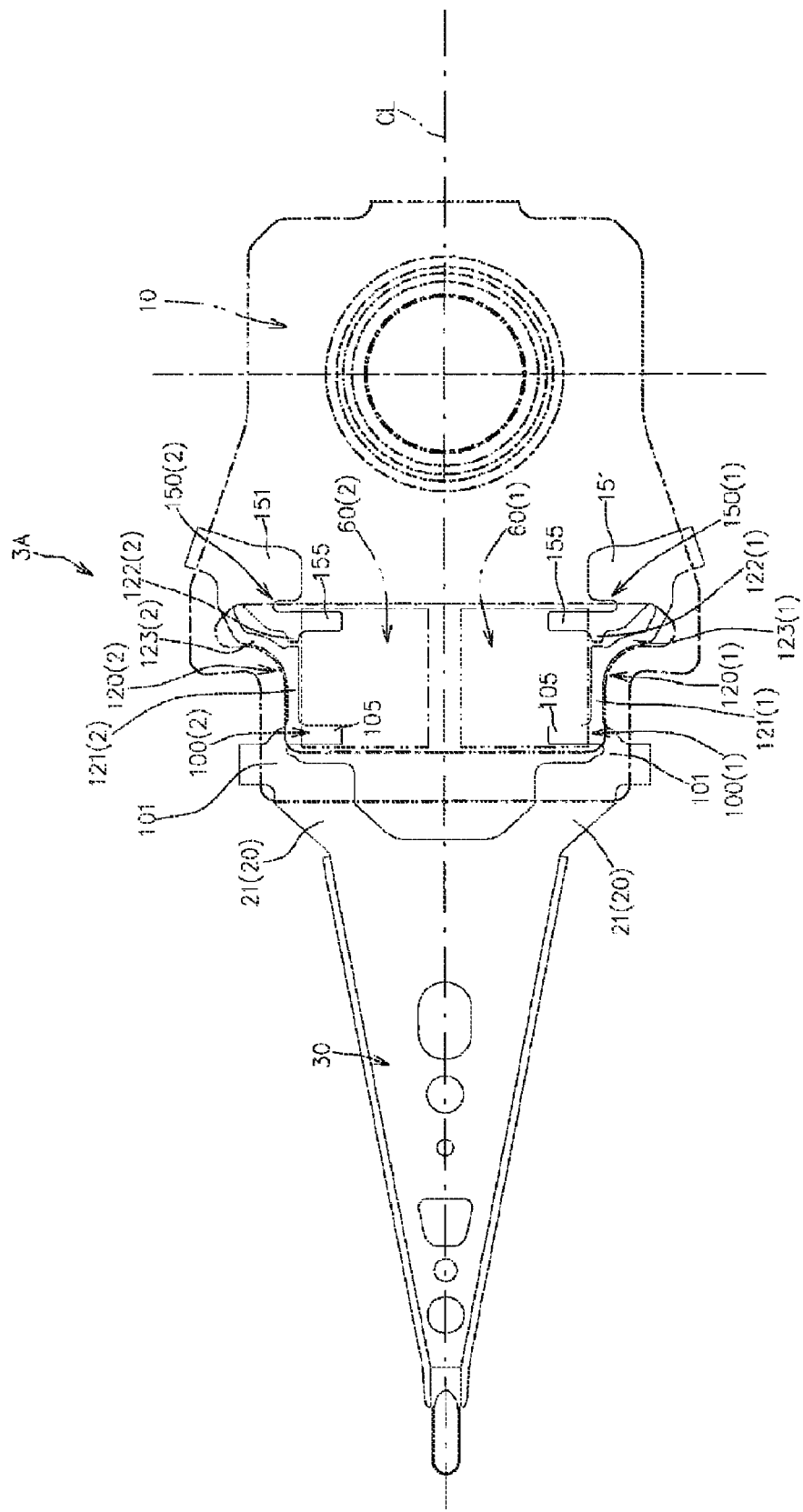
FIG. 14 is a top view of a magnetic head suspension according to a modified example of the third embodiment.

FIG. 14 is a top view of a magnetic head suspension 3B according to a modified example of the present embodiment.

In the figure, the members same as those in the first to third embodiments are denoted by the same reference numerals to omit the detailed description thereof.

Furthermore, for the purpose of easier understanding, the flexure part 40 is not shown, and the supporting part 10 and the first, and second piezoelectric elements 60(1), 60(2) are shown with chain double-dashed line in FIG. 14.

In the magnetic head suspension 3B according to the modified example, each of the paired connecting beams 14 is disposed so that its proximal end connected to the proximal end section 11 is positioned farther outward than its distal end connected to the distal end section 12 with respect to the suspension width direction, in the same manner as in the magnetic head suspensions 1A to 3A according to the first to third embodiments.

More specifically, the open section 13 includes a portion having a width that becomes wider as it goes from a distal side to a proximal side in the suspension longitudinal direction.

The magnetic head suspension 3B according to the modified example includes the same components as the magnetic head suspension 3A with the connecting beams 14 according to the present embodiment, and further includes a first auxiliary connecting piece 123(1) having a distal end that is connected to the first distal portion 121(1) and a distal end that is positioned farther outward than the distal end in the suspension width direction and is connected to the first-proximal end side-metal plate 150(1), and a second auxiliary connecting piece 123(2) having a distal end that is connected to the second distal portion 121(2) and a distal end that is positioned farther outward than the distal end in the suspension width direction and is connected to the second-proximal end side-metal plate 150(2).

The magnetic head suspension 3B according to the modified example makes it possible to exert the same effect as those in the magnetic head suspension 3A according to the present embodiment, and further enhance handleability of the first and second-proximal side-metal plates 150(1), 150(2) during the manufacturing process while preventing the expansion and contraction motion of the paired piezoelectric elements 60(1), 60(2) from being obstructed.

Fourth Embodiment

Hereinafter, still another embodiment of the magnetic head suspension according to the present invention will be described, with reference to the attached drawings.

Figure 15:
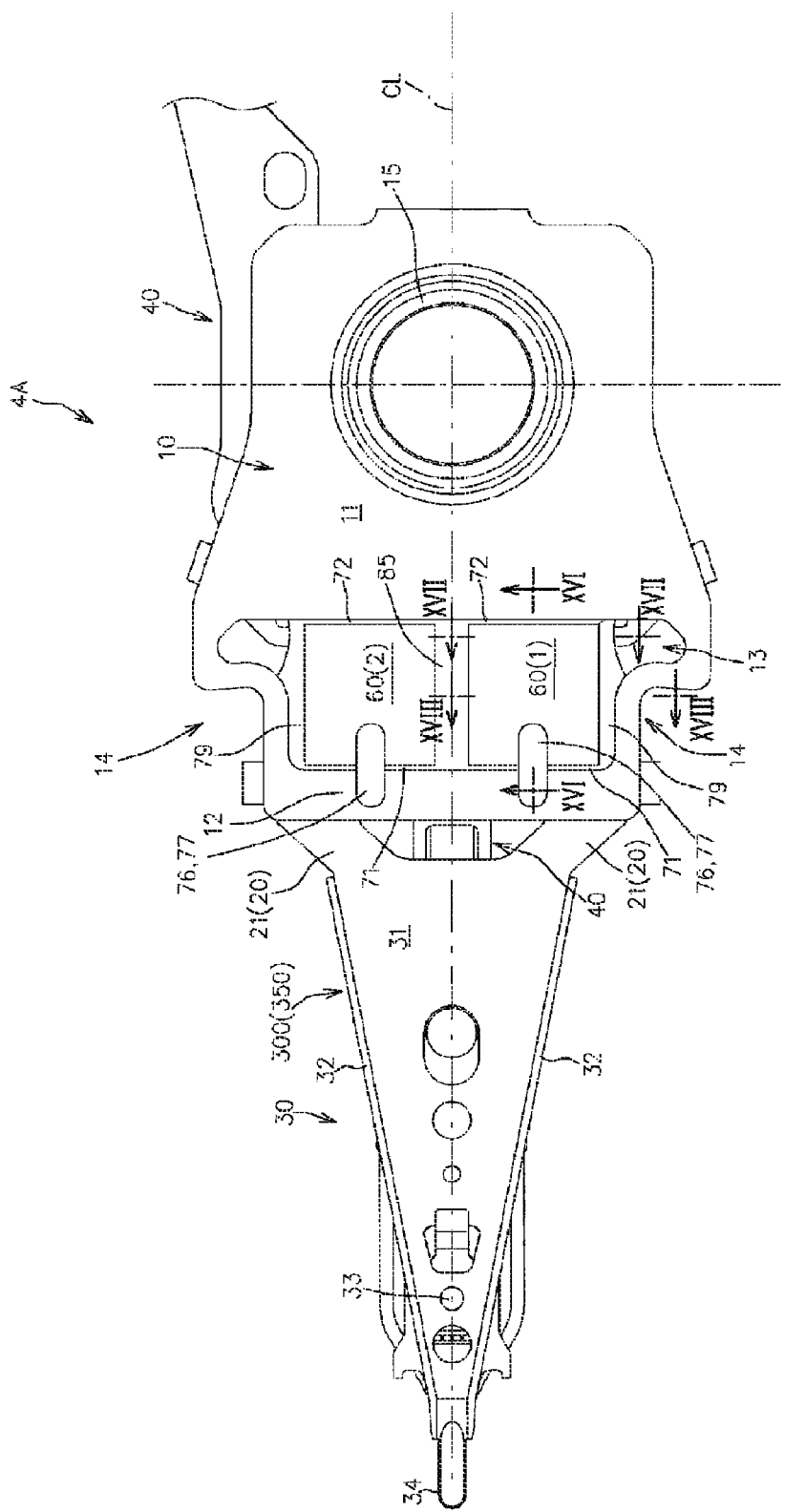
FIG. 15 is a top view of a magnetic head suspension according to a fourth embodiment of the present invention.

FIG. 15 is a top view (a plan view as viewed from a side opposite from a disk surface) of a magnetic head suspension 4A according to the present embodiment.

Figure 16:
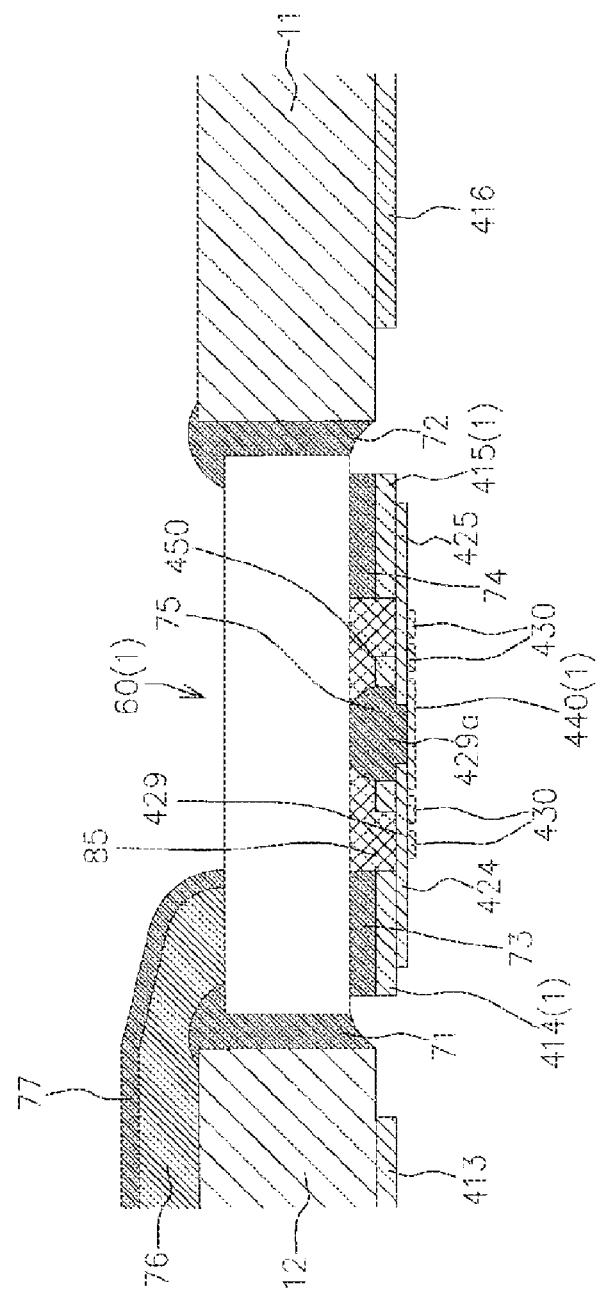
FIG. 16 is a cross sectional view taken along line XVI-XVI in FIG. 15.

FIGS. 16 to 18 are cross sectional views taken along lines XVI-XVI, XVII-XVII and XVIII-XVIII in FIG. 15.

In the figures, the members same as those in the first to third embodiments are denoted by the same reference numerals to omit the detailed description thereof.

The magnetic head suspension 4A according to the present embodiment is different from the magnetic head suspension 1A in that it further includes an outer lateral side-insulative adhesive agent 80 for the first piezoelectric element and an outer lateral side-insulative adhesive agent (not shown) for the second piezoelectric element.

As shown in FIG. 18, the outer lateral side-insulative adhesive agent 80 for the first piezoelectric element connects the distal side-insulative adhesive agent 73 and the proximal side-insulative adhesive agent 74 (see FIG. 16) in a state where it connects the insulting layer 420 and the lower electrode layer of the first piezoelectric element 60(1) on an outer side of the conductive adhesive agent 75 for the first piezoelectric element 60(1) in the suspension width direction.

Similarly, the outer lateral side-insulative adhesive agent for the second piezoelectric element connects the distal side-insulative adhesive agent 73 and the proximal side-insulative adhesive agent 74 in a state where it connects the insulting layer 420 and the lower electrode layer of the second piezoelectric element 60(2) on an outer side of the conductive adhesive agent 75 for the second piezoelectric element 60(2) in the suspension width direction.

More specifically, in the magnetic head suspension 4A according to the present embodiment, the distal side-insulative adhesive agent 73 for the first piezoelectric element, the distal side-insulative adhesive agent 73 for the second piezoelectric element, the proximal side-insulative adhesive agent 74 for the first piezoelectric element, the proximal side-insulative adhesive agent 74 for the second piezoelectric element, the outer lateral side-insulative adhesive agent 80 for the first piezoelectric element, the outer lateral side-insulative adhesive agent 80 for the second piezoelectric element, the connecting region 429 of the insulating layer 420, the lower electrode layer of the first piezoelectric element 60(1) and the lower electrode layer of the second piezoelectric element 60(2) form a space that is substantially sealed other than the gap between the first and second piezoelectric elements 60(1), 60(2) being opened in a direction away from the disk surface in a state of accommodating the lower surface side-conductive adhesive agents 75 for the first and second piezoelectric elements 60(1), 60(2).

The thus configured magnetic head suspension 4A makes it possible to effectively prevent the filler particles (mainly Ag particles), which are included in the conductive adhesive agents 75, from falling onto the disk surface.

Furthermore, in the present embodiment, as shown in FIGS. 16 and 18, the space is filled with a sealing insulative adhesive agent 85.

The configuration makes it possible to prevent the filler particles (mainly Ag particles), which are included in the conductive adhesive agents 75, from falling onto the disk surface in a more stable manner, and also effectively prevent electrochemical migration of Ag.

More specifically, usage of the magnetic head suspension 4A over long periods of time may give rise to a phenomenon (electrochemical migration) that a metal (mainly Ag) included in the lower surface side-conductive adhesive agent 75 is ionized (to be mainly Ag+) and moves within an insulative member (a resin included in the conductive adhesive agent 75 in this case) while growing up. The phenomenon is activated if the ionized substance initiates a chemical reaction with moisture in an atmosphere.

In this regard, in the present embodiment, the lower surface side-conductive adhesive agents 75 is enclosed with the sealing insulative adhesive agent 85. The configuration makes it possible to prevent electrochemical migration of Ag, and also prevent silver ion from growing up as much as possible.

The magnetic head suspension 4A with the sealing insulative adhesive agent 85 can be efficiently manufactured by a following manufacturing method, for example.

More specifically, the manufacturing method may include a step of preparing a suspension intermediate in which the supporting part 10, the load bending part 20, the load beam part 30, the flexure part 40, the paired distal side-metal plates 100(1), 100(2) and the paired proximal side-metal plates 150(1), 150(2) are integrated with one another, a first adhesive application step of applying the distal side-insulative adhesive agent 73 onto the first and second piezoelectric element-distal end side-support plates and also applying the proximal side-insulative adhesive agent 74 onto the first and second piezoelectric element-proximal end side-support plates, a second adhesive application step of applying the outer lateral side-insulative adhesive agent 80 for the first piezoelectric element and the outer lateral side-insulative adhesive agent for the second piezoelectric element, a third adhesive application step of applying the lower surface side-conductive adhesive agents 75 for the first and second piezoelectric elements, a piezoelectric element setting step of setting the first and second piezoelectric elements 60(1), 60(2) at respective predetermined positions within the open section 13 after the first to third adhesive application steps, a fourth adhesive application step of applying the end surface side-insulative adhesive agents 71, 72 before or after the piezoelectric element setting step, a curing step of curing the adhesives applied by the first to fourth steps so that the first and second piezoelectric elements 60(1), 60(2) are fixed, and a step of filling the sealing insulative adhesive agent 85 in the space through the gap between the first and second piezoelectric elements 60(1), 60(2) in the suspension width direction from the opposite side from the disk surface.

The manufacturing method may include a fifth adhesive application step of applying the upper surface side-conductive adhesive agents 76 so as to be across the respective upper electrode layers of the first and second piezoelectric elements 60(1), 60(2), which are positioned on a side opposite from the disk surface, and the distal end section 12 of the supporting part 10.

Furthermore, in the present embodiment, there are provided outer lateral side-insulative adhesive agents 79 so as to cover the respective outer lateral surfaces of the first and second piezoelectric elements 60(1), 60(2) that face outward in the suspension width direction.

The outer lateral side-insulative adhesive agent 79 is connected to at least part of the corresponding connecting beam 14.

Spines may occur at the outer lateral surfaces of the electrode layers of the piezoelectric elements 60(1), 60(2) when the piezoelectric elements 60(1), 60(2) are cut out from a wafer by dicing. The provision of the outer lateral side-insulative adhesive agents 79 makes it possible to effectively prevent the spines from dropping during the use of the magnetic head suspension 4A, and/or prevent the particles of the piezoelectric main bodies from dropping at the time when the piezoelectric elements 60(1), 60(2) are expanded and contracted.

The outer lateral side-insulative adhesive agent 79 may be applied to the magnetic head suspension 1A according to the first embodiment.

What is claimed is:

1. A magnetic head suspension comprising a load bending part that generates a load for pressing a magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part so as to be symmetrical with each other with respect to a suspension longitudinal center line and have expansion and contraction directions different from each other, in order to enable micro motion of the magnetic head slider in a seek direction, wherein the supporting part includes a proximal end section that is directly or indirectly connected to the main actuator, a distal end section to which the load bending part is connected, an open section that is positioned between the proximal end section and the distal end section in a suspension longitudinal direction, and paired right and left connecting beams that are positioned on both sides of the open section in a suspension width direction and connect the proximal end section and the distal end section, wherein the load bending part includes paired right and left elastic plates that have plate surfaces facing the disk surface and are disposed away from each other with the suspension longitudinal center line being sandwiched between them, the elastic plates having proximal ends connected to the distal end section and distal ends supporting a proximal side of the load beam part, wherein the flexure part includes a flexure metal plate welded to disk-facing surfaces of the load beam part and the supporting part, an insulating layer laminated on a disk-facing surface of the flexure metal plate, and a signal wiring laminated on a disk-facing surface of the insulating layer, wherein the flexure metal plate includes a load beam part-overlapped region that is overlapped with and welded to the disk-facing surface of the load beam part, a supporting part-distal side-overlapped region that is overlapped with and welded to the disk-facing surface of the distal end section between the paired elastic plates in the suspension width direction, a load bending part-corresponding part that connects the load beam part-overlapped region and the supporting part-distal side-overlapped region between the paired elastic plates in the suspension width direction, a supporting part-proximal side-overlapped region that is overlapped with and welded to the disk-facing surface of the proximal end section, a distal end side-center-support plate forming region that extends from the supporting part-distal side-overlapped region so as to be positioned within the open section, and a proximal end side-center-support plate forming region that extends from the supporting part-proximal side-overlapped region so as to be positioned within the open section in a state of being away from the distal end side-center-support plate forming region in the suspension longitudinal direction, wherein the insulating layer includes a load beam part-corresponding region, a load bending part-corresponding, a supporting part-distal side-corresponding region, a distal end side-center-support plate corresponding region, a proximal end side-center-support plate corresponding region and a supporting part-proximal side-corresponding region that are laminated on the disk-facing surfaces of the load beam part-overlapped region, the load bending part-corresponding part, the supporting part-distal side-overlapped region, the distal end side-center-support plate forming region, the proximal end side-center-support plate forming region and the supporting part-proximal side-overlapped region of the flexure metal plate, respectively, and further includes a connecting region that connects the distal end side-center-support plate corresponding region and the proximal end side-center-support plate corresponding region, wherein there are provided paired right and left first and second-distal side-metal plates that are fixed to the disk-facing surface of the distal end section, and there are also provided paired right and left first and second-proximal side-metal plates that are fixed to the disk-facing surface of the proximal end section, wherein each of the paired distal side-metal plates includes a distal end side-fixed region overlapped with and fixed to a portion of the disk-facing surface of the distal end section that is positioned on an outer side of the supporting part-distal side-overlapped region in the suspension width direction, and a distal end side-lateral-support plate forming region extending from the distal end side-fixed region so as to be positioned on an outer-side of the distal end side-center-support plate forming region in the suspension width direction within the open section, wherein each of the paired proximal side-metal plates includes a proximal end side-fixed region overlapped with and fixed to a portion of the disk-facing surface of the proximal end section that is positioned on an outer side of the supporting part-proximal side-overlapped region in the suspension width direction, and proximal end side-lateral-support plate forming region extending from the proximal end side-fixed region so as to be positioned on an outer side of the proximal end side-center-support plate forming region in the suspension width direction within the open section, wherein the first piezoelectric element has a distal side-end surface and a proximal-side end surface that face a proximal side-end surface of the distal end section and a distal side-end surface of the proximal end section, respectively, with end surface side-insulative adhesive agents being interposed, and also has a disk-facing surface whose distal side mounted on a first piezoelectric element-distal end side-support plate, which is formed by a distal end side-first width portion of the distal end side-center-support plate forming region that is positioned on one side in the suspension width direction and the distal end side-lateral-support plate forming region of the first-distal side-metal plate, with a distal side-insulative adhesive agent being interposed, and proximal side mounted on a first piezoelectric element-proximal end side-support plate, which is formed by a proximal end side-first width portion of the proximal end side-center-support plate forming region that is positioned on the one side in the suspension width direction and the proximal end side-lateral-support plate forming region of the first-proximal side-metal plate, with a proximal side-insulative adhesive agent being interposed, and wherein the second piezoelectric element has a distal side-end surface and a proximal-side end surface that face the proximal side-end surface of the distal end section and the distal side-end surface of the proximal end section, respectively, with end surface side-insulative adhesive agents being interposed, and also has a disk-facing surface whose distal side mounted on a second piezoelectric element-distal end side-support plate, which is formed by a distal end side-second width portion of the distal end side-center-support plate forming region that is positioned on the other one side in the suspension width direction and the distal end side-lateral-support plate forming region of the second-distal side-metal plate, with a distal side-insulative adhesive agent being interposed, and proximal side mounted on a second piezoelectric element-proximal end side-support plate, which is formed by a proximal end side-second width portion of the proximal end side-center-support plate forming region that is positioned on the other one side in the suspension width direction and the proximal end side-lateral-support plate forming region of the second-proximal side-metal plate, with a proximal side-insulative adhesive agent being interposed.

2. A magnetic head suspension according to claim 1, wherein the flexure metal plate further includes a bridge region that is positioned between the paired first and second piezoelectric elements in the suspension width direction and connects the distal end side-center-support plate forming region and the proximal end side-center-support plate forming region.

3. A magnetic head suspension according to claim 1,
wherein the connecting region is disposed so as to be at least partially overlapped with the first and second piezoelectric elements in a plan view,
wherein the flexure part includes first and second voltage supply wirings laminated on the disk-facing surface of the insulting layer,
wherein the first and second voltage supply wirings have proximal ends capable of being connected to an outside voltage supply source and distal ends overlapped with the corresponding piezoelectric elements in a plan view,
wherein the connecting region of the insulting layer is formed with openings at positions corresponding to the distal ends of the first and second voltage supply wirings so that the distal ends of the first and second voltage supply wirings are electrically connected to electrode layers of the corresponding piezoelectric elements that are positioned closer to the disk surface through conductive adhesive agents, and
wherein there are provided metal rings on a surface of the insulting layer that is opposite from the disk-facing surface so as to surround the conductive adhesive agents.

4. A magnetic head suspension according to claim 1,
wherein the connecting region is disposed so as to be at least partially overlapped with the first and second piezoelectric elements in a plan view,
wherein the flexure part includes first and second voltage supply wirings laminated on the disk-facing surface of the insulting layer,
wherein the first and second voltage supply wirings have proximal ends capable of being connected to an outside voltage supply source and distal ends overlapped with the corresponding piezoelectric elements in a plan view,
wherein the connecting region of the insulting layer is formed with openings at positions corresponding to the distal ends of the first and second voltage supply wirings so that the distal ends of the first and second voltage supply wirings are electrically connected to lower electrode layers of the corresponding piezoelectric elements that are positioned closer to the disk surface through conductive adhesive agents,
wherein there are provided paired first sealed space forming-insulative adhesive agents on both sides in the suspension width direction of the conductive adhesive agent for the first piezoelectric element, the paired first sealed space forming-insulative adhesive agents connecting the distal side-insulative adhesive and the proximal side-insulative adhesive agent with respect to the suspension longitudinal direction and also connecting the insulting layer and the lower electrode layer of the first piezoelectric element with respect to a direction orthogonal to the disk surface, and
wherein there are provided paired second sealed space forming-insulative adhesive agents on both sides in the suspension width direction of the conductive adhesive agent for the second piezoelectric element, the paired second sealed space forming-insulative adhesive agents connecting the distal side-insulative adhesive and the proximal side-insulative adhesive agent with respect to the suspension longitudinal direction and also connecting the insulting layer and the lower electrode layer of the second piezoelectric element with respect to the direction orthogonal to the disk surface.

5. A magnetic head suspension according to claim 1,
wherein the connecting region is disposed so as to be at least partially overlapped with the first and second piezoelectric elements in a plan view,
wherein the flexure part includes first and second voltage supply wirings laminated on the disk-facing surface of the insulting layer, wherein the first and second voltage supply wirings have proximal ends capable of being connected to an outside voltage supply source and distal ends overlapped with the corresponding piezoelectric elements in a plan view, wherein the connecting region of the insulting layer is formed with openings at positions corresponding to the distal ends of the first and second voltage supply wirings so that the distal ends of the first and second voltage supply wirings are electrically connected to lower electrode layers of the corresponding piezoelectric elements that are positioned closer to the disk surface through conductive adhesive agents, wherein there is provided an outer lateral side-insulative adhesive agent on an outer side in the suspension width direction of the conductive adhesive agent for the first piezoelectric element, the outer lateral side-insulative adhesive agent connecting the distal side-insulative adhesive and the proximal side-insulative adhesive agent with respect to the suspension longitudinal direction and also connecting the insulting layer and the lower electrode layer of the first piezoelectric element with respect to a direction orthogonal to the disk surface, and wherein there is provided an outer lateral side-insulative adhesive agent on an outer side in the suspension width direction of the conductive adhesive agent for the second piezoelectric element, the outer lateral side-insulative adhesive agent connecting the distal side-insulative adhesive and the proximal side-insulative adhesive agent with respect to the suspension longitudinal direction and also connecting the insulting layer and the lower electrode layer of the second piezoelectric element with respect to the direction orthogonal to the disk surface.

6. A magnetic head suspension according to claim 5, wherein a space, which is formed by the distal side-insulative adhesive agent for the first piezoelectric element, the distal side-insulative adhesive agent for the second piezoelectric element, the proximal side-insulative adhesive agent for the first piezoelectric element, the proximal side-insulative adhesive agent for the second piezoelectric element, the outer lateral side-insulative adhesive agent for the first piezoelectric element, the outer lateral side-insulative adhesive agent for the second piezoelectric element, the connecting region of the insulating layer, the lower electrode layer of the first piezoelectric element and the lower electrode layer of the second piezoelectric element, is filled with a sealing insulative adhesive agent.

7. A magnetic head suspension according to claim 1, wherein there are provided outer lateral side-insulative adhesive agents so as to cover respective outer lateral surfaces of the first and second piezoelectric elements that face outward in the suspension width direction, the outer lateral side-insulative adhesive agents being connected to at least parts of the corresponding connecting beams.

8. A magnetic head suspension according to claim 1,
wherein the distal end side-center-support plate forming region includes a distal end side-center portion extending from the supporting part-distal side-overlapped region toward the proximal side of the suspension, the distal end side-first width portion extending from the distal end side-center portion toward one side in the suspension width direction to form the first piezoelectric element-distal end side-support plate in cooperation with the distal end side-lateral-support plate forming region of the first-distal side-metal plate, and the distal end side-second width portion extending from the distal end side-center portion toward the other one side in the suspension width direction to form the second piezoelectric element-distal end side-support plate in cooperation with the distal end side-lateral-support plate forming region of the second-distal side-metal plate, wherein the proximal end side-center-support plate forming region includes a proximal end side-center portion extending from the supporting part-proximal side-overlapped region toward the distal side of the suspension, the proximal end side-first width portion extending from the proximal end side-center portion toward one side in the suspension width direction to form the first piezoelectric element-proximal end side-support plate in cooperation with the proximal end side-lateral-support plate forming region of the first-proximal side-metal plate, and the proximal end side-second width portion extending from the proximal end side-center portion toward the other one side in the suspension width direction to form the second piezoelectric element-proximal end side-support plate in cooperation with the proximal end side-lateral-support plate forming region of the second-proximal side-metal plate, wherein the first and second piezoelectric element-distal end side-support plates are disposed so that a gap is made between the proximal edge of the distal end section and the distal edges of the both support plates, and wherein the first and second piezoelectric element-proximal end side-support plates are disposed so that a gap is made between the distal edge of the proximal end section and the proximal edges of the both support plates.

9. A magnetic head suspension according to claim 1, wherein the load beam part, the load bending part and the distal side-metal plates are integrally formed with one another.

10. A magnetic head suspension according to claim 1, further comprising a first connecting piece that is positioned on an outer side of the first piezoelectric element in the suspension width direction and connects the first-distal side-metal plate and the first-proximal side-metal plate, and a second connecting piece that is positioned on an outer side of the second piezoelectric element in the suspension width direction and connects the second-distal side-metal plate and the second-proximal side-metal plate, wherein each of the first and second connecting pieces has an accordion shape in a plan view.

11. A magnetic head suspension according to claim 1, further comprising a first extending piece that is positioned on an outer side of the first piezoelectric element with respect to the suspension width direction and extends along the suspension longitudinal direction, and a second extending piece that is positioned on an outer side of the second piezoelectric element with respect to the suspension width direction and extends along the suspension longitudinal direction, wherein the first extending piece includes a first distal portion connected to the first-distal end side-metal plate and a first proximal portion connected to the first-proximal end side-metal plate, the first distal portion and the first proximal portion facing to each other with having a gap between them, and wherein the second extending piece includes a second distal portion connected to the second-distal end side-metal plate and a second proximal portion connected to the second-proximal end side-metal plate, the second distal portion and the second proximal portion facing to each other with having a gap between them.

12. A magnetic head suspension according to claim 11, wherein each of the connecting beams is disposed so that its proximal end connected to the proximal end section is positioned farther outward than its distal end connected to the distal end section with respect to the suspension width direction, wherein there is provided a first auxiliary connecting piece having a distal end that is connected to the first distal portion and a distal end that is positioned farther outward than the distal end in the suspension width direction and is connected to the first-proximal end side-metal plate, and wherein there is provided a second auxiliary connecting piece having a distal end that is connected to the second distal portion and a distal end that is positioned farther outward than the distal end in the suspension width direction and is connected to the second-proximal end side-metal plate.

13. A manufacturing method of the magnetic head suspension defined by claim 1, comprising, a step of forming an intermediate metal sheet from a load beam substrate, the intermediate metal sheet including plural of suspension distal side-man bodies and plural of the paired proximal side-metal plates, each of the suspension distal side-man bodies integrally including the load beam part, the load bending part and the paired distal side-metal plates, the plural of suspension distal side-man bodies being connected to a carrier through first support pieces, the plural of paired proximal side-metal plates being connected directly or indirectly to the carrier through second support pieces, a step of fixing the supporting part to the suspension distal side-man body and the corresponding paired proximal side-metal plates, and a step of separating an assembly in which the suspension distal side-man body, the paired proximal side-metal plates and the supporting part are integrated with one another from the carrier by cutting the first and second support pieces.

14. A manufacturing method of the magnetic head suspension according to claim 13, further comprising a step of fixing the flexure part to the assembly before the step of separating the assembly from the carrier.

15. A manufacturing method of the magnetic head suspension according to claim 13, further comprising a step of fixing the flexure part to the assembly after the step of separating the assembly from the carrier.

16. A manufacturing method of the magnetic head suspension defined by claim 6, comprising, a step of preparing a suspension intermediate in which the supporting part, the load bending part, the load beam part, the flexure part, the paired distal side-metal plates and the paired proximal side-metal plates are integrated with one another, a first adhesive application step of applying the distal side-insulative adhesive agent onto the first and second piezoelectric element-distal end side-support plates and also applying the proximal side-insulative adhesive agent onto the first and second piezoelectric element-proximal end side-support plates, a second adhesive application step of applying the outer lateral side-insulative adhesive agent for the first piezoelectric element and the outer lateral side-insulative adhesive agent for the second piezoelectric element, a third adhesive application step of applying the conductive adhesive agents for the first and second piezoelectric elements, a piezoelectric element setting step of setting the first and second piezoelectric elements at respective predetermined positions within the open section after the first to third adhesive application steps, a fourth adhesive application step of applying the end surface side-insulative adhesive agent before or after the piezoelectric element setting step, a curing step of curing the adhesives applied by the first to fourth steps so that the first and second piezoelectric elements are fixed, and a step of filling the sealing insulative adhesive agent in the space through the gap between the first and second piezoelectric elements in the suspension width direction from the opposite side from the disk surface.

\* \* \* \* \*